United States Patent
Gomis et al.

(10) Patent No.: US 12,359,060 B2
(45) Date of Patent: Jul. 15, 2025

(54) POLYMERS

(71) Applicant: BIOME BIOPLASTICS LIMITED, Southampton (GB)

(72) Inventors: Maria Gomis, Marchwood (GB); Paul Mines, Marchwood (GB); Tony Longdon, Marchwood (GB); Daniel Arnillas, Marchwood (GB)

(73) Assignee: BIOME BIOPLASTICS LIMITED, Southampton (GB)

( * ) Notice: Subject to any disclaimer, the term of this patent is extended or adjusted under 35 U.S.C. 154(b) by 0 days.

(21) Appl. No.: 18/548,883

(22) PCT Filed: Oct. 27, 2022

(86) PCT No.: PCT/EP2022/080087
§ 371 (c)(1),
(2) Date: Sep. 1, 2023

(87) PCT Pub. No.: WO2023/186340
PCT Pub. Date: Oct. 5, 2023

(65) Prior Publication Data
US 2024/0279460 A1    Aug. 22, 2024

(30) Foreign Application Priority Data
Mar. 30, 2022  (EP) ..................... 22165648

(51) Int. Cl.
   *C08L 67/02*    (2006.01)
(52) U.S. Cl.
   CPC ........... *C08L 67/02* (2013.01); *C08L 2205/03* (2013.01)
(58) Field of Classification Search
   CPC ...... C08L 67/02; C08L 67/04; C08L 2205/02; C08L 2205/03
   See application file for complete search history.

(56) References Cited

U.S. PATENT DOCUMENTS

| | | | |
|---|---|---|---|
| 5,883,199 A | 3/1999 | McCarthy et al. | |
| 6,268,434 B1 * | 7/2001 | Tsai | D04H 1/435 524/378 |
| 2012/0107630 A1 | 5/2012 | Krishnaswamy et al. | |
| 2016/0185955 A1 * | 6/2016 | Chen | C08L 67/04 524/425 |
| 2018/0118895 A1 * | 5/2018 | Johnson | C08J 3/18 |
| 2018/0334564 A1 | 11/2018 | Andrews et al. | |
| 2020/0095420 A1 | 3/2020 | Johnson et al. | |
| 2022/0002504 A1 | 1/2022 | Doerrstein | |

FOREIGN PATENT DOCUMENTS

| | | | |
|---|---|---|---|
| CA | 1339026 C | 3/1997 | |
| CN | 102492271 A | 6/2012 | |
| CN | 102731976 A | 10/2012 | |
| CN | 103073862 A | 5/2013 | |
| CN | 104479304 A | 4/2015 | |
| CN | 108017887 A * | 5/2018 | |
| CN | 108822514 A * | 11/2018 | ............... C08J 5/18 |
| CN | 111040394 A | 4/2020 | |
| CN | 112341650 A | 2/2021 | |
| EP | 1229075 A1 | 8/2002 | |
| ES | 2017562 A6 | 2/1991 | |
| IT | MI20090094 A1 | 7/2010 | |
| KR | 20130052774 A | 5/2013 | |
| WO | WO2012120309 A2 | 9/2012 | |
| WO | WO2020172722 A1 | 9/2020 | |
| WO | WO2021125402 A1 | 6/2021 | |
| WO | WO2022008710 A1 | 1/2022 | |
| WO | WO2022054063 A1 | 3/2022 | |

OTHER PUBLICATIONS

CN-108822514-A (Nov. 16, 2018) machine translation.*
CN-108017887-A (May 11, 2018) machine translation.*
Narancic et al., Biodegradable Plastic Blends Create New Possibilities for End-of-Life Management of Plastics but They Are Not a Panacea for Plastic Pollution, Environ. Sci. Technol. 2018, 52, 10441-10452.
International Search Report and Written Opinion of PCT/EP2022/080087 dated Mar. 22, 2023, 17 pages.
T. Narancic, et al., Biodegradable Plastics Blends Create New Possibilities for End-of-Life Management of Plastics but They Are Not a Panacea for Plastic Pollution, *Environmental Science & Technology*, (2018) 52, 10441-10452.
Pischedda, A., Tosin, M., Degli-Innocenti, F., *Biodegradation of plastics in soil: The effect of temperature*, Polymer Degradation and Stability, vol. 170, 2019, 109017, ISSN 0141-3910, https://doi.org/10.1016/j.polymdegradstab.2019.109017.
AS 5810-2010 (*Australian Standard: Biodegradable plastics—Biodegradable plastics suitable for home composting*).
ISO 14855-1:2012(E) (*Determination of the ultimate aerobic biodegradability of plastic materials under controlled composting conditions—Method by analysis of evolved carbon dioxide—Part 1: General method*).
ISO 17556:2019(E) (*Plastics—Determination of the ultimate aerobic biodegradability of plastic materials in soil by measuring the oxygen demand in a respirometer or the amount of carbon dioxide evolved*).
P K Samantaray et al., ACS Sustainable Chem. Eng. 2021, 9, 28, 9151-9164.
*Claims on Biodegradability and Compostability on Products and Packaging*, European Plastics, Jan. 2021.
T. Fujimaki, Polymer Degradation and Stability, 59 (1998) 209-214.
Kosior, E., Braganca, R., Fowler, Paul., Jan. 1, 2006, *Lightweight Compostable Packaging: Literature Review*.

(Continued)

*Primary Examiner* — Ana L. Woodward
(74) *Attorney, Agent, or Firm* — Squire Patton Boggs (US) LLP

(57) ABSTRACT

The present application relates to the use of poly(butylene succinate co-adipate) (PBSA), mixed with a further substance comprising one or more polymers to form a polymeric blend, to improve the home compostability and/or soil biodegradability of the further substance comprising one or more polymers.

18 Claims, 11 Drawing Sheets

(56) References Cited

OTHER PUBLICATIONS

W. Pivsa-Art et al., Energy Procedia, 9, (2011), pp. 581-588.
Altieri, R., Seggiani, M., Esposito, A et al. *Thermoplastic Blends Based on Poly(Butylene Succinate-co-Adipate) and Different Collagen Hydrolysates from Tanning Industry-II: Aerobic Biodegradation in Composting Medium.* J Polym Environ 29, 3375-3388 (2021). https://doi.org/10.1007/s10924-021-02124-3.
T. Debuissy et al., European Polymer Journal, 87, (2017), pp. 84-98.
W. Pivsa-Art, et al., J. Appl. Polym. Sci. 2015, 132, 41856.
Examination Report for Application No. 24151963.6 dated Nov. 28, 2024.

\* cited by examiner

Figure 3:
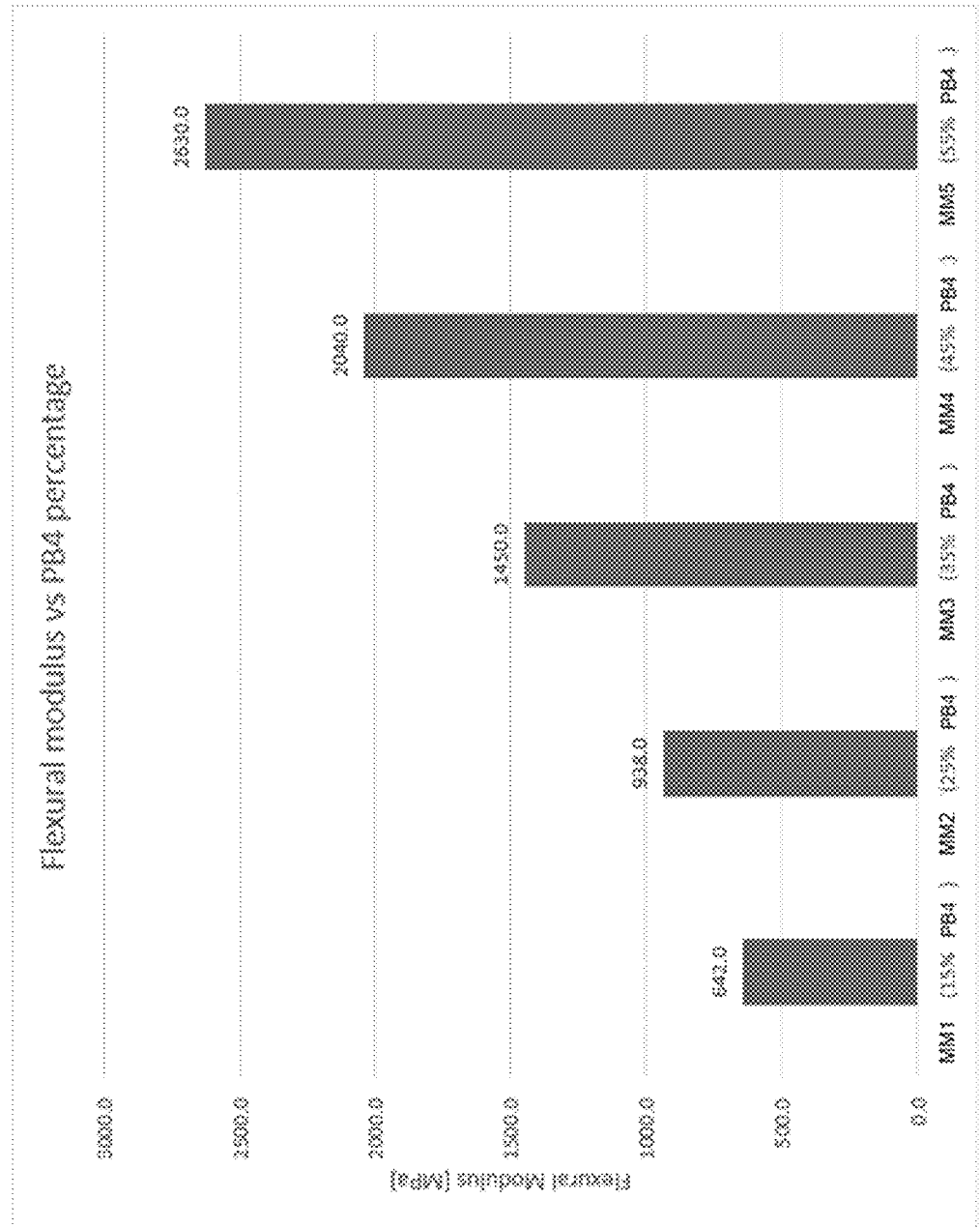

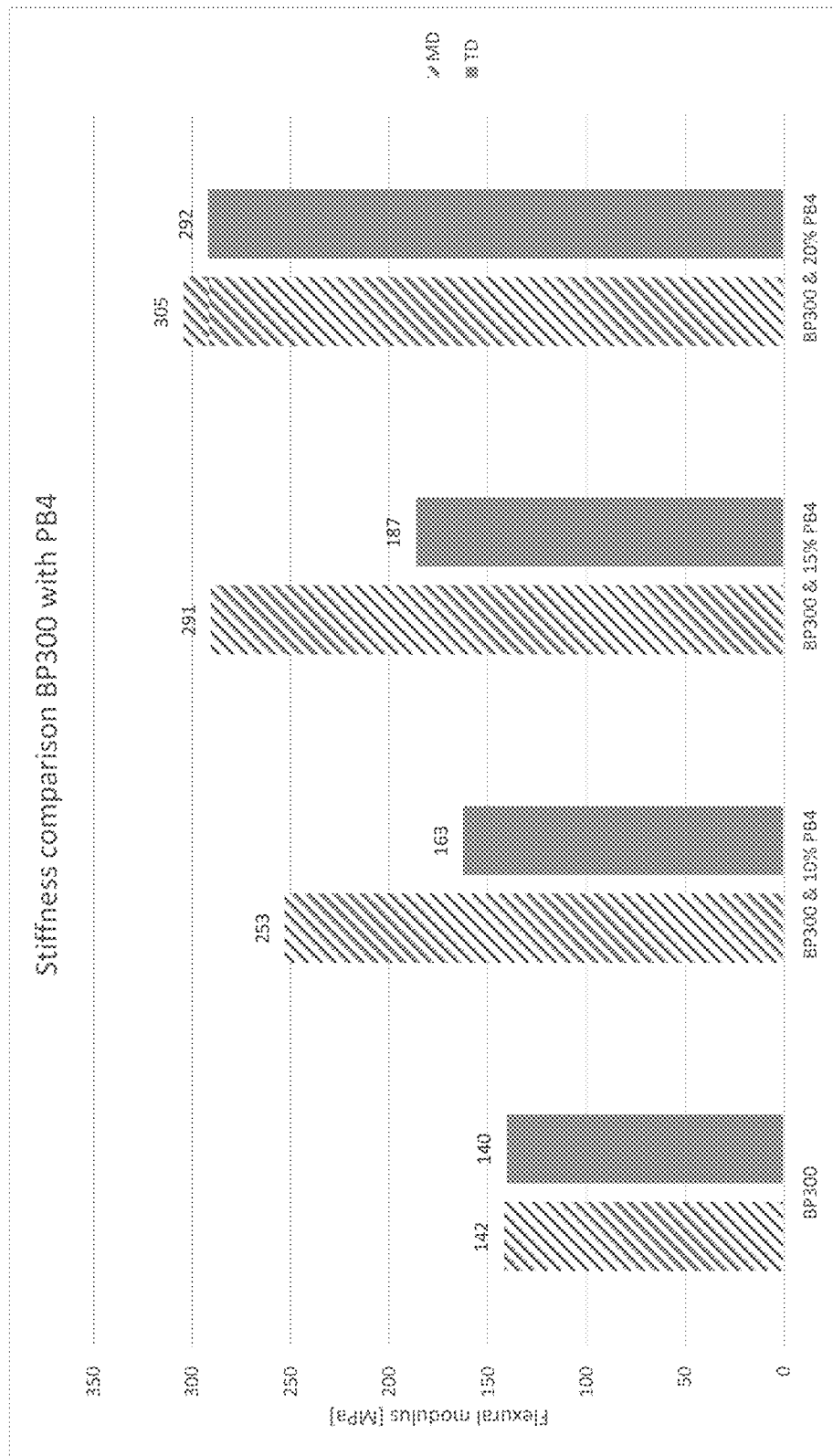
Fig. 3.1

Figure 4:
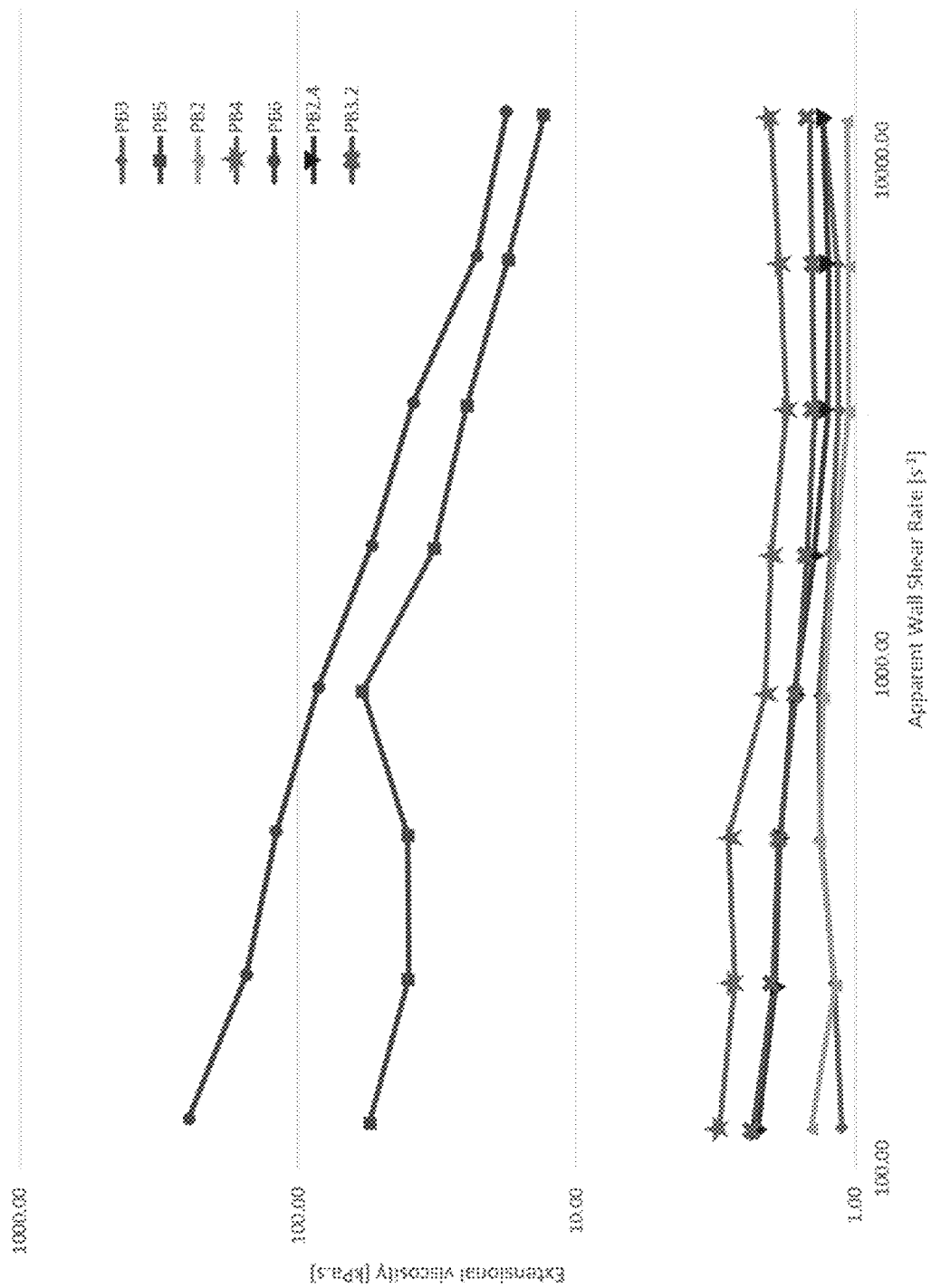

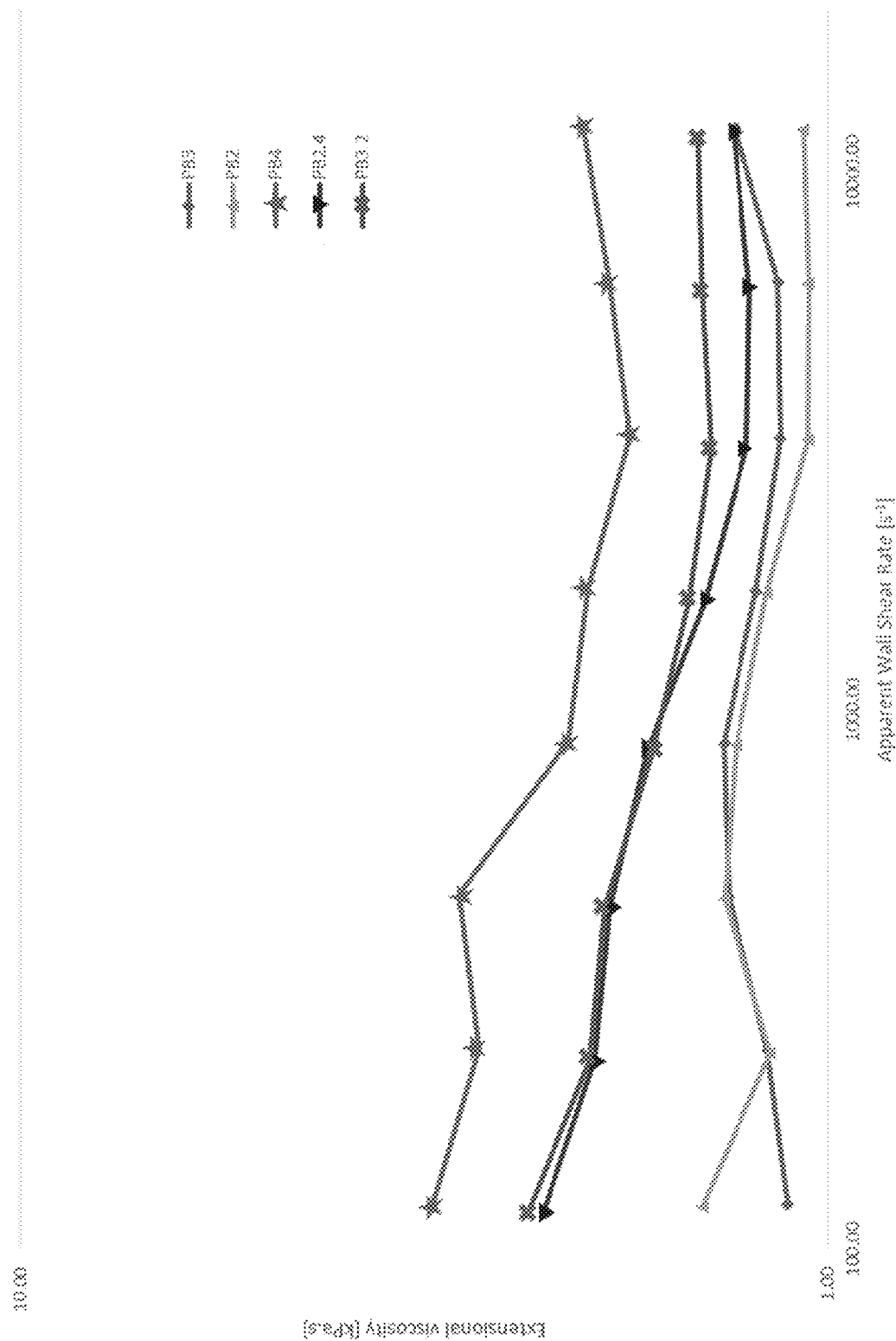
Fig. 4.1

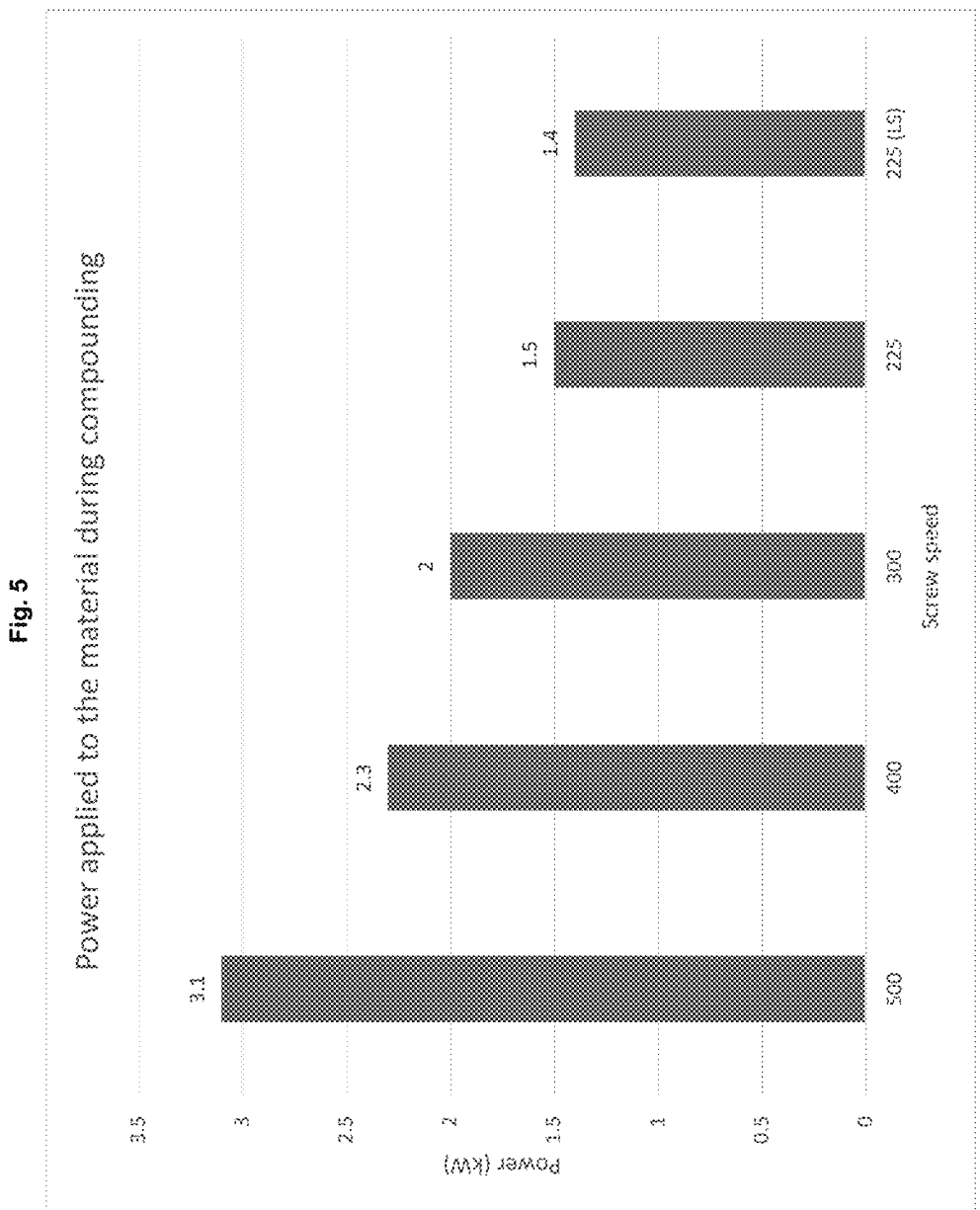

Fig. 6
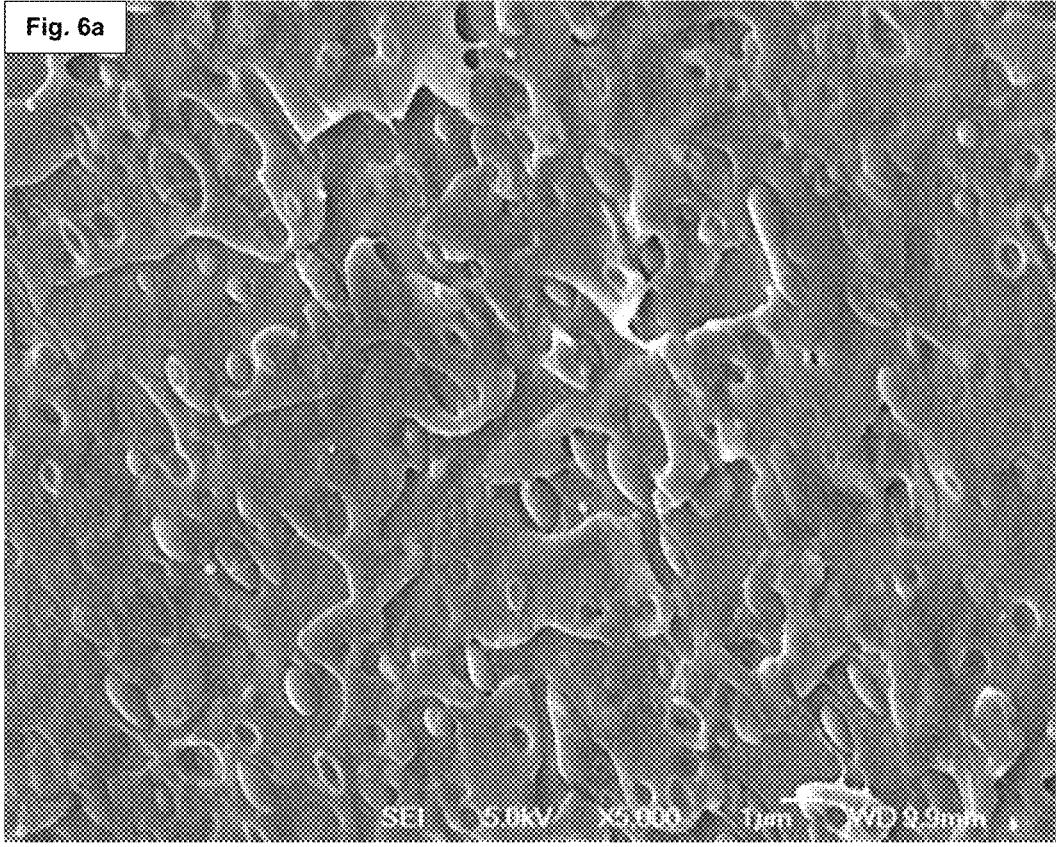
Fig. 6a
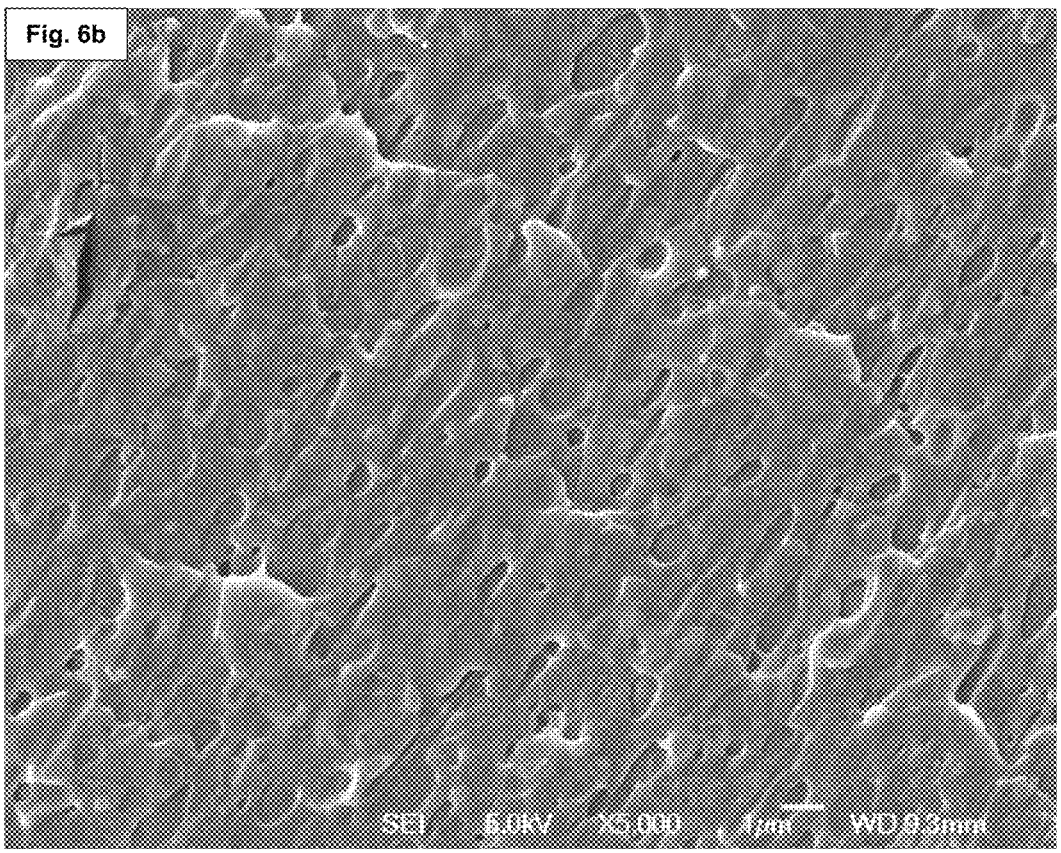
Fig. 6b

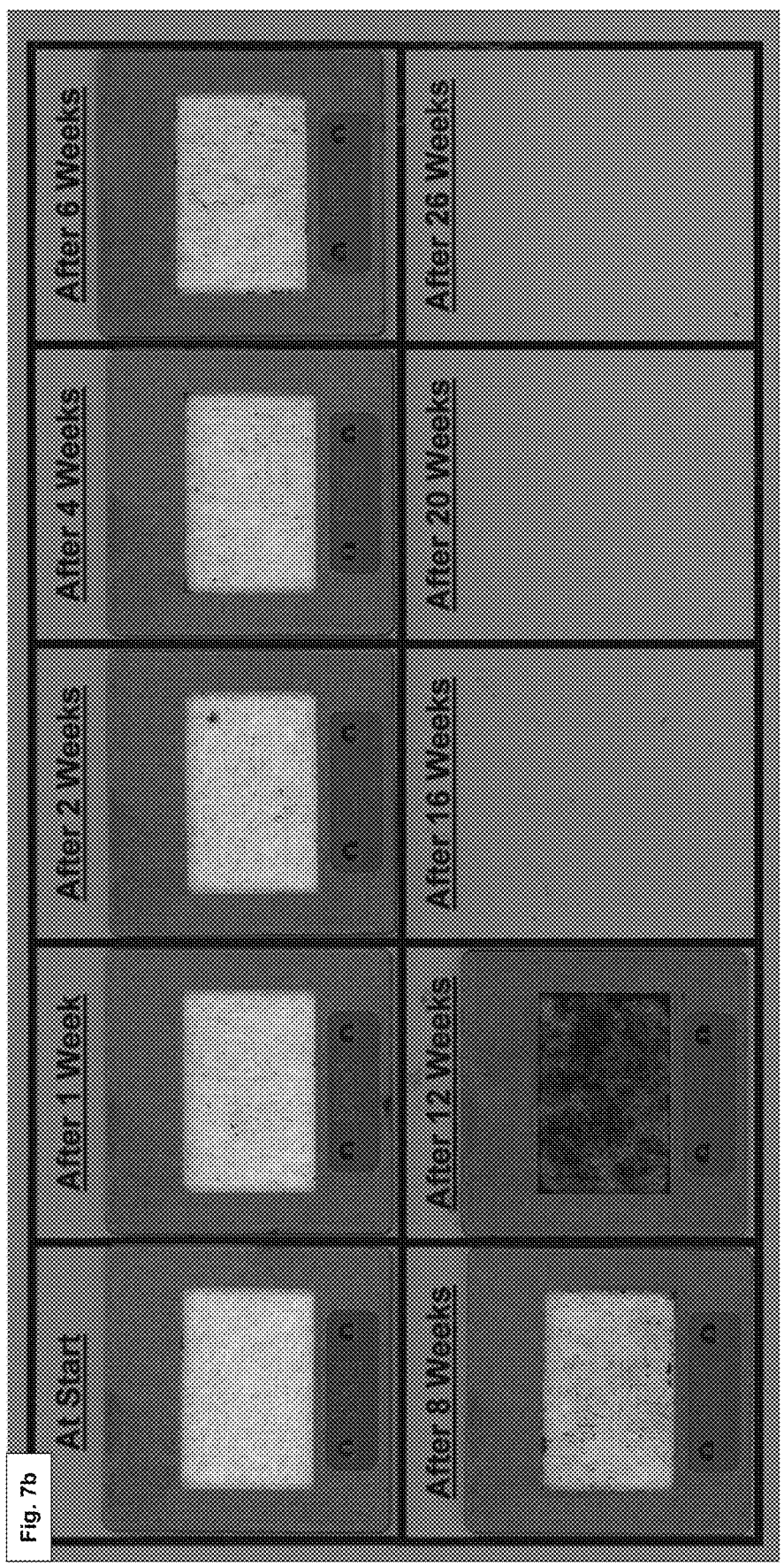

POLYMERS

This application is a National Stage filing under 35 U.S.C. 371 (c) of International PCT Patent Application No. PCT/EP2022/080087, filed Oct. 27, 2022, which claims priority to, and the benefit of EP Application Serial No. 22165648.1, filed Mar. 30, 2022, the entire contents of which are herein incorporated by reference in its entirety for all purposes.

TECHNICAL FIELD

The present disclosure relates to the use of poly(butylene succinate co-adipate) (PBSA) to improve biodegradability/compostability and to the use of a blend comprising PBSA and a polyester to improve stiffness.

BACKGROUND

Plastics are useful materials for a variety of applications, thanks to their wide range of versatile and tuneable properties. However, many common plastics cause an environmental impact due to their production from fossil fuels, as well as their typically poor biodegradability and/or compostability.

A focus in the production of modern plastics has therefore been improving their end-of-life biodegradability (the plastics preferably being home compostable and/or soil biodegradable). However, it is often the case that biodegradable/compostable plastics suffer from reduced performance compared to their non-biodegradable/compostable analogues. For example, many biodegradable/compostable plastics have poor or insufficient stiffness properties as compared with such analogues.

Furthermore, different plastics are able to biodegrade/compost under different conditions (e.g. varying temperatures and/or pressures, aeration, mechanical agitation, etc.) and this can cause issues for home users who may not be able to supply the required conditions for the given plastic. For example, poly(lactic acid) (PLA) is typically produced from plant starch and has a range of applications. Although PLA is generally considered to be compostable, this is typically conducted under industrial composting conditions (e.g. using the methods outlined in EN 13432), so it is often not possible for a consumer to compost PLA at home. PLA is instead typically composted in an industrial setting, where elevated temperatures, pressures, etc. are applied to facilitate degradation.

It would be desirable to produce a polymeric blend or mixed material that has improved biodegradability/compostability (e.g. that is home compostable and/or soil biodegradable) and/or improved stiffness, and/or to obviate, mitigate and/or ameliorate one or more deficiencies in known polymeric blends and/or mixed materials, and/or uses thereof and/or methods employing same, whether identified herein or otherwise.

SUMMARY

According to a first aspect of the present disclosure, there is provided a use of poly(butylene succinate co-adipate) (PBSA), mixed with a further substance comprising one or more polymers to form a polymeric blend, to improve the home compostability and/or soil biodegradability of the further substance comprising one or more polymers.

According to a second aspect, there is provided a method of improving the home compostability and/or soil biodegradability of a substance comprising one or more polymers, the method comprising mixing the substance comprising one or more polymers with poly(butylene succinate co-adipate) (PBSA) to form a polymeric blend.

According to a third aspect, there is provided a use of a polymeric blend comprising poly(butylene succinate co-adipate) (PBSA) and a polyester (optionally a biodegradable and/or compostable polyester, such as PLA) as a stiffening agent for a material, wherein the polymeric blend and material collectively form a mixed material.

According to a fourth aspect, there is provided a method of stiffening a material, wherein the material is or has been mixed with a polymeric blend comprising poly(butylene succinate co-adipate) (PBSA) and a polyester (optionally a biodegradable and/or compostable polyester, such as PLA) to form a mixed material, wherein the mixed material has a higher stiffness than the material.

According to a fifth aspect, there is provided a product comprising a polymeric blend comprising polyester (optionally a biodegradable and/or compostable polyester, such as PLA) and poly(butylene succinate co-adipate) (PBSA), wherein:
  the polymeric blend is home compostable and/or soil biodegradable; and/or
  the polymeric blend has a flexural modulus greater than around 2000 MPa (optionally wherein the polymeric blend is as defined above),
  optionally wherein the product comprises a mixed material as defined above.

According to a sixth aspect, there is provided a product formable by the methods above (e.g. according to the first, second, third or fourth aspects), optionally wherein said product is formed by said method.

According to a seventh aspect, there is provided a use of poly(butylene succinate co-adipate) (PBSA), mixed with a further substance comprising one or more polymers to form a polymeric blend, to improve the home compostability and/or soil biodegradability of the further substance comprising one or more polymers;
  wherein the PBSA is or has been provided as a masterbatch, wherein the masterbatch comprises PBSA diluted with a further substance comprising one or more polymers;
  preferably wherein said PBSA is mixed by extrusion;
  optionally wherein the further substance comprising one or more polymers is the same further substance comprising one or more polymers as that described above;
  optionally wherein said use is as described above.

According to an eighth aspect, there is provided a method of improving the home compostability and/or soil biodegradability of a substance comprising one or more polymers, the method comprising mixing the substance comprising one or more polymers with poly(butylene succinate co-adipate) (PBSA) to form a polymeric blend;
  wherein the PBSA is provided as a masterbatch prior to said mixing, wherein the masterbatch comprises PBSA diluted with a further substance comprising one or more polymers;
  preferably wherein said mixing is by extrusion;
  optionally wherein the further substance comprising one or more polymers is the same further substance comprising one or more polymers as that described above;
  optionally wherein said method is as described above.

Definitions

The following definitions apply for terms used herein. In the event that any term is not specifically defined here or otherwise, the standard meaning in the present technical field prevails. This standard meaning may bear in mind definitions provided in common general knowledge (e.g. standard textbooks) in the present technical field. Usefully, for example, chemical terms may be interpreted in accordance with the IUPAC Gold Book Version 3.0.1.

The term "at least one" is synonymous with "one or more", e.g. one, two, three, four, five, six, or more.

As used herein, the terms "around", "about" or "substantially" generally encompass or refer to a range of values that one skilled in the art would consider equivalent to the recited values (e.g. having the same function or result, and/or achieved substantially in the same way). Suitably, where the term "about" is used in relation to a numerical value, it can represent (in increasing order of preference) a 10%, 5%, 2%, 1% or 0% deviation from that value.

When a method is described as including the step "mixing a further substance comprising one or more polymers" and the resultant polymeric blend is specified as comprising various components, it will be appreciated that the further substance comprising one or more polymers used in that mixing step must involve the various components needed to form that polymeric blend. For example, if the polymeric blend comprises poly(butylene succinate co-adipate) (PBSA) and poly(lactic acid) (PLA) and this is formed by "mixing a further substance comprising one or more polymers" with poly(butylene succinate co-adipate) (PBSA), then the "further substance comprising one or more polymers" must comprise poly(lactic acid) (PLA).

The term "consists essentially of" is used herein to denote that a given use, method or product consists of only designated materials and optionally other materials that do not materially negatively affect the characteristic(s) of the use, method or product. In the context of a polymeric blend, for example, this term may be understood to denote that the polymeric blend consists of only the designated "substance comprising one or more polymers" and optional other materials which do not negatively affect the biodegradability/compostability characteristics of that polymeric blend. Similar considerations apply to given uses and methods. Suitably, a use, method or product which consists essentially of a designated material (or materials) comprises greater than or equal to about 85 wt % of the designated material(s), more suitably greater than or equal to about 90 wt %, more suitably greater than or equal to about 95 wt %, more suitably greater than or equal to about 98 wt %, more suitably greater than or equal to about 99 wt % of the designated material(s); based on the total weight of the polymeric blend.

The term "monomer" is one of the art. For the avoidance of any doubt, monomers are molecules that can be bonded to other molecules to form a polymer or a copolymer comprising units of the monomer.

The term "polymer" as used herein may refer to a molecule comprising two or more (such as three or more, four or more, five or more, six or more, seven or more, eight or more, nine or more, or ten or more) monomer units. A polymer may comprise many monomer units, such as 100 or more monomer units.

The term "poly(lactic acid)", abbreviated as "PLA", refers to a specific polymer having the chemical structure:

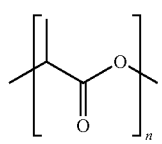

wherein "n" is an integer of two or more (such as three or more, four or more, five or more, six or more, seven or more, eight or more, nine or more, or ten or more), representing the number of monomer units in the polymer. PLA may comprise many monomer units, such as 100 or more monomer units. A typical molecular weight for PLA may be:
 (a) at least around 1 kDa, optionally at least around 10 kDa, optionally at least around 20 kDa, optionally at least around 30 kDa, optionally at least around 40 kDa; and/or
 (b) at most around 1000 kDa, optionally at most around 500 kDa, optionally at most around 400 kDa, optionally at most around 300 kDa, optionally at most around 200 kDa; and/or
 (c) around 1 to 1000 kDa, optionally around 10 to 500 kDa, optionally around 20 to 400 kDa, optionally around 30 to 300 kDa, optionally around 40 to 200 kDa.

The term "poly(butylene succinate co-adipate)", abbreviated as "PBSA", refers to a specific polymer having the chemical structure:

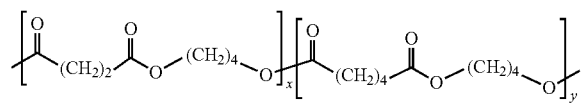

wherein "x" and "y" are integers of one or more, representing the number of each monomer unit in the polymer. A typical x:y ratio for PBSA is around 5:1 to 1:5, optionally around 4:1 to 1:4, optionally around 3:1. The polymer may comprise either a random sequence of the two monomers shown, and/or alternating blocks of like monomers. A typical molecular weight for PBSA may be:
 (a) at least around 1 kDa, optionally at least around 10 kDa, optionally at least around 20 kDa, optionally at least around 30 kDa, optionally at least around 40 kDa; and/or
 (b) at most around 1000 kDa, optionally at most around 500 kDa, optionally at most around 400 kDa, optionally at most around 300 kDa, optionally at most around 200 kDa; and/or
 (c) around 1 to 1000 kDa, optionally around 10 to 500 kDa, optionally around 20 to 400 kDa, optionally around 30 to 300 kDa, optionally around 40 to 200 kDa.

The term "poly(caprolactone)", abbreviated as "PCL", refers to a specific polymer having the chemical structure:

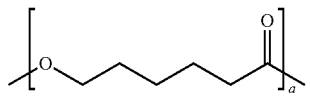

wherein "a" is an integer of two or more (such as three or more, four or more, five or more, six or more, seven or more, eight or more, nine or more, or ten or more), representing the number of monomer units in the polymer. PCL may comprise many monomer units, such as 100 or more monomer units. A typical molecular weight for PCL may be:
 (a) at least around 1 kDa, optionally at least around 10 kDa, optionally at least around 20 kDa, optionally at least around 30 kDa, optionally at least around 40 kDa; and/or
 (b) at most around 1000 kDa, optionally at most around 500 kDa, optionally at most around 400 kDa, optionally at most around 300 kDa, optionally at most around 200 kDa; and/or (c) around 1 to 1000 kDa, optionally around 10 to 500 kDa, optionally around 20 to 400 kDa, optionally around 30 to 300 kDa, optionally around 40 to 200 kDa, optionally around 40 to 90 kDa.

The term "poly(butylene adipate-co-terephthalate)", abbreviated as "PBAT", refers to a specific polymer having the chemical structure:

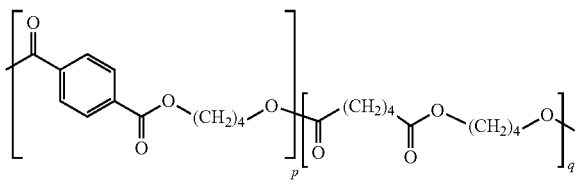

wherein "p" and "q" are integers of one or more, representing the number of each monomer unit in the polymer. A typical p:q ratio for PBAT is around 5:1 to 1:5, optionally around 4:1 to 1:4, optionally around 3:1 to 1:3, optionally around 2:1 to 1:2, optionally around 0.55:0.45. The polymer may comprise either a random sequence of the two monomers shown, and/or alternating blocks of like monomers. A typical molecular weight for PBAT is around may be:
  (a) at least around 1 kDa, optionally at least around 10 kDa, optionally at least around 20 kDa, optionally at least around 30 kDa, optionally at least around 40 kDa, optionally at least around 50 kDa, optionally at least around 60 kDa; and/or
  (b) at most around 1000 kDa, optionally at most around 500 kDa, optionally at most around 400 kDa, optionally at most around 300 kDa, optionally at most around 200 kDa, optionally at most around 100 kDa, optionally at most around 65 kDa; and/or
  (c) around 1 to 1000 kDa, optionally around 10 to 500 kDa, optionally around 20 to 400 kDa, optionally around 30 to 300 kDa, optionally around 40 to 200 kDa, optionally around 50 to 100 kDa, optionally around 60 to 65 kDa.

It can also be assumed that the ends of polymers and/or co-polymers referred to herein have filled valences, e.g. through bonding to atoms, such as hydrogen, or groups of atoms.

The term "biodegradable", as used herein, means degradable by means of microorganisms, such as fungi, bacteria, viruses, algae, etc., and/or by exposure to enzymatic mechanisms. As applied to a given product, such as a product comprising a polymeric blend, the requirement "biodegradable" should be understood to be met if the majority of that product is biodegradable, i.e. if the product is "partially" biodegradable. It is not intended that the entire product must be biodegradable, since the product may comprise biodegradable and non-biodegradable materials. For example, in the context of a mixed material comprising a polymeric blend and one or more further ingredients, the product would be understood to be at least partially biodegradable if the polymeric components in the polymeric blend are biodegradable, even if the one or more further ingredients in the mixed material are not biodegradable. Suitably, at least about 60% of the product may be biodegradable, on a weight basis; optionally at least about 70%; optionally at least about 80%; optionally at least about 90%; optionally at least about 95%; optionally about 100% of the product may be biodegradable. Generally speaking, greater biodegradability is preferred.

The term "compostable" (e.g. home compostable), as used herein, means degradable to form compost. As applied to a given product, such as a product comprising a polymeric blend, the requirement "compostable" should be understood to be met if the majority of that product is compostable, i.e. if the product is "partially" compostable. It is not intended that the entire product must be compostable, since the product may comprise compostable and non-compostable materials. For example, in the context of a mixed material comprising a polymeric blend and one or more further ingredients, the product would be understood to be at least partially compostable if the polymeric components in the polymeric blend are compostable, even if the one or more further ingredients in the mixed material are not compostable. Suitably, at least about 60% of the product may be compostable, on a weight basis; optionally at least about 70%; optionally at least about 80%; optionally at least about 90%; optionally at least about 95%; optionally about 100% of the product may be compostable. Generally speaking, greater compostability is preferred.

When the term "home compostable" is used herein to describe a material, this may be understood to mean the material is able to pass the threshold assessment set out in AS 5810-2010 (*Australian Standard: Biodegradable plastics—Biodegradable plastics suitable for home composting*). Specifically, the material passes the four procedures of the assessment: characterisation, biodegradability, disintegration and compost quality (including toxicity). In the biodegradability procedure, the test method used is that given in ISO 14855-1:2012(E) (*Determination of the ultimate aerobic biodegradability of plastic materials under controlled composting conditions—Method by analysis of evolved carbon dioxide—Part 1: General method*), wherein the ambient temperature is fixed at 28° C. When testing for conformity with home compostability as quoted herein, measurement variables may be fixed in accordance with the procedure outlined in Example 3.

When the term "soil biodegradable" is used herein to describe a material, this may be understood to mean the material is able to pass the threshold assessment set out in ISO 17556:2019(E) (*Plastics—Determination of the ultimate aerobic biodegradability of plastic materials in soil by measuring the oxygen demand in a respirometer or the amount of carbon dioxide evolved*). This assessment involves preparing a test soil, and monitoring the degradation of the test material compared to a reference material at a fixed temperature of around 20 to 28° C. When testing for conformity with soil biodegradability as quoted herein, measurement variables may be fixed in accordance with the procedure outlined in Example 4.

When the term "melt spinnable" is used herein to describe a material, this may be understood to mean the material is able to form a stable filament by means of a spinning process, comprising a die (e.g. a spinneret). Spinning is a specific type of extrusion in which one or more liquid jets of material are exposed to a quenching fluid upon exiting the die (e.g. air at a temperature sufficient to solidify the material). The quenching fluid may be configured to cause the jet(s) to solidify as a continuous filament leaving the die. Such processes are well-known to persons of skill in the art. Generally speaking, a spinning process can produce monofilaments (where the spinneret die has only a single orifice and only one jet is formed) or multiple filaments (with corresponding numbers of orifices/jets). Multi-filament processes typically require more delicate handling of the filaments/jets therein. A spinning process can also produce multicomponent fibres with configurations such as core-sheath, islands-in-the-sea, pie chart/segmented and side-by-side. Such configurations are known to persons of skill in the art.

Spunbonding can be a difficult technique to operate and/or optimise, since disruption of any one of the jets/filaments of material exiting the die (i.e. breaking the continuity of the jet/filament) may cause the resultant filament to break. Since the filaments are pulled away from jets leaving the die, filament breakage means that the pulling force can no longer be transmitted along the filament and into the jet. The pulling force also guides filaments/jets leaving the die, and so breakage also means that such guidance is lost. Collectively, these factors may result in an unguided filament impacting other filaments/jets as it leaves the die. Since the filament/jet is at a high temperature (above the melting point of the material in the jet), an impacting filament/jet can bond with other filaments/jets, thereby further affecting the extrusion process. Typically, it is necessary to terminate the process if a small number (such as about five) of filaments are broken (noting that a spun bonding die may have thousands of orifices and thereby generate thousands of filaments).

"Melt spinnable" as used herein therefore refers to the ability of the material to undergo such monofilament and/or multi-filament processes (particularly multi-filament processes). The present disclosure may generate materials which are capable of undergoing spinning processes with a great number of orifices/jets, such as at least around 50 orifices per metre of width, optionally at least around 100, optionally at least around 500, optionally at least about 1500 optionally at least about 2000, optionally at least about 4000 orifices per metre of width; optionally at least about 6000, optionally at least about 6800 (optionally up to around 10,000, such as up to around 5000, such as up to around 3000). The spunbonding die may have an orifice density of between about 1500 and about 3500 orifices per metre of width; such as about 2000 to about 3000; such as about 2250 to about 2750 orifices per metre of width.

The term "extensional viscosity" means the resistance of a fluid to extensional flow. Extensional viscosity of materials may be measured using the assessment set out in ISO 20965:2021. The assessment determines the fluidity of plastic melts subjected to shear stresses at rates and temperatures approximating those arising in plastics processing. When testing for conformity with extensional viscosity values quoted herein, measurement variables may be fixed in accordance with the procedure outlined in Example 8.

The term "stiffness" is well understood. The stiffness of a material may be considered in terms of the flexural and/or tensile properties of the material.

Stiffness in terms of the flexural properties of the material may be represented by the flexural modulus of the material. The term "flexural modulus" means the ability of a material to resist bending. When used herein, the flexural modulus of materials may be measured using the assessment set out in ISO 178:2019, involving a three-point loading test on a freely supported beam of material. A material having a higher flexural modulus has a higher stiffness.

Stiffness in terms of the tensile properties of the material may be represented by the Young's modulus of the material. The term "Young's modulus" means the ability of a material to resist stretching. When used herein, the Young's modulus of materials may be measured using the assessment set out in ISO 527-1:2019, involving stretching a material along its major longitudinal axis. A material having a higher Young's modulus has a higher stiffness.

Differential Scanning Calorimetry (DSC) may suitably be used to determine the glass transition temperature ($T_g$) and the melting point ($T_m$). The glass transition temperature of the material may be measured using ASTM D3418-15 and/or ISO 11357-2:2013.

A polymeric blend refers to a mixture/blend of two or more polymers. The two or more polymers in the blend typically do not react during said mixture/blending and are thereby present as two or more distinct chemical entities. For consistency, the term "polymeric blend" is generally used herein to describe a mixture of PBSA and a further substance comprising one or more polymers, wherein said polymeric blend has an improved biodegradability/compostability relative to the further substance comprising one or more polymers, and/or wherein said polymeric blend may be used as a stiffening agent. Specific polymeric blends described in the Examples herein are given reference numbers PB1 ("Polymeric Blend 1"), PB2 etc.

The term "mixed material" as used herein refers to a material comprising a polymeric blend that is or has been mixed with one or more further ingredients. For example, a polymeric blend comprising PBSA and PLA may be mixed with a filler to form a mixed material comprising PBSA, PLA and the filler. The polymeric blend and one or more further ingredients typically do not react during said mixture and are thereby present as distinct chemical entities.

The term "mixed material" is sometimes used herein to describe a mixture of a polymeric blend, and another polymer. An example might be a mixed material comprising (a) a polymeric blend comprising PBSA and PLA and (b) a material comprising PBAT. Although this mixed material might validly be referred to as a polymeric blend, the chosen wording was selected to emphasise the point that the polymeric blend is a distinct and/or key component of the mixed material. Specific mixed materials described in the Examples herein are given reference numbers MM1 ("Mixed Material 1"), MM2 etc.

Where the amount of a particular ingredient of a polymeric blend is expressed as a "wt %, based on the total weight of the polymeric blend", this may be calculated as follows:

$$\text{wt \%} = \frac{\text{weight of particular ingredient}}{\text{total weight of polymeric blend}} \times 100\%$$

Where the amount of a particular ingredient of a mixed material is expressed as a "wt %, based on the total weight of the mixed material", this may be calculated as follows:

$$\text{wt \%} = \frac{\text{weight of particular ingredient}}{\text{total weight of mixed material}} \times 100\%$$

Where the wt % amounts of several components are listed, it will be appreciated that the sum of those wt % amounts must equal no more than 100 wt %. The sum may be less than 100 wt %, indicating that there are further, non-listed components present.

The term "polymeric content" as used herein refers to solely the polymeric components of a product (e.g. a polymeric blend or mixed material). For example, in a polymeric blend consisting essentially of PLA and PBSA, the polymeric content refers to the total amount of PLA and PBSA in this polymeric blend.

For ease of interpretation, in some instances the sum of the (left-hand and right-hand) integers in a ratio is 100. When relevant, this is explicitly indicated herein. If a polymeric blend is described as comprising "around 1:99 to 7:93 PBSA to PLA, based on the weights of said PBSA and PLA and wherein the sum of integers in the ratio is 100", this means that, for example, around 100 g of the polymeric blend would comprise around 1 g to 7 g of PBSA and around 99 g to 93 g of PLA, provided the sum of the weights of PBSA and PLA is around 100 g.

Where the term "at least" is applied to ratios, this should be interpreted as referring to the fact that the first number in the ratio is the number shown or is larger than the number shown, and/or the second number in the ratio is the number shown or is correspondingly smaller than the number shown. For example, a polymeric blend described as comprising "at least around 1:99 PBSA to PLA, based on the weights of PBSA and PLA and wherein the sum of integers in the ratio is 100" means that a ratio described as such may have values such as 1:99, or 2:98, or 3:97. This would mean that, for example, 100 g of said polymeric blend would comprise of at least around 1 g of PBSA and at most around 99 g of PLA, or at least 2 g of PBSA and at most 98 g of PLA, or at least 3 g of PBSA and at most 97 g of PLA.

The converse of the above is true when the term "at most" is applied to ratios.

The terms "intimately mixed" and "intimate mixing", as used herein, may be understood to refer to mixing two or more substances in a way that causes intimate co-mingling of the substances, such that the two or more substances are in close contact. In the context of a mixture of two individual polymer chains, it will be understood that intimate mixing relates to close contact of the polymer chains at numerous locations (such as one chain being wrapped around the length of the other, e.g. in a helical fashion). Typically, on the bulk scale, a mixture may be understood to comprise domains/droplets/islands (discontinuous domain) of one substance mixed (e.g. dispersed) among a "sea" (continuous domain) of another polymer. When intimately mixed, it will be appreciated that the majority of islands in the sea are relatively small, whereas when non-intimately mixed, the majority of islands in the sea are large. Scanning electron microscopy, as described herein, is a useful technique for understanding the degree of intimacy of mixing.

Intimate mixing may be achieved using a mixing device configured to provide a high specific mechanical energy (e.g. high shear) to the two or more substances. A high specific mechanical energy may be achieved by mechanisms well-known to those of skill in the art, such as through the use of a screw rotating at a high screw speed, a high shear screw, and/or a screw configured to apply a high torque to the two or more substances.

The term "specific mechanical energy", as used herein, may be understood to refer to the energy applied to the two or more materials during mixing, per unit mass, in the form of work from the mixing device. Specific mechanical energy may be understood to be mutually exclusive from thermal energy. Mixing may be conducted in an adiabatic manner, e.g. with a heating jacket around the barrel of the extruder, to keep internal temperature constant during mixing (e.g. friction arising from shear mixing). In other words, the specific mechanical energy refers to the energy imparted during mixing which is not lost due to thermal losses (e.g. friction-based heating of mixer components). A high specific mechanical energy as described herein may be understood to be of a value of at least around 0.20 kW·h·kg$^{-1}$, such as at least around 0.25 kW·h·kg$^{-1}$, or at least around 0.28 kW·h·kg$^{-1}$, or at least around 0.30 kW·h·kg$^{-1}$.

Specific mechanical energy may be calculated as follows:

$$\text{specific mechanical energy} = \text{maximum power} \times \frac{\text{screw speed}}{\text{maximum screw speed}} \times \frac{(\text{torque}/100)}{\text{throughput}}$$

where specific mechanical energy has units of kW·h·kg$^{-1}$, power has units of kW, screw speed has units of rpm, torque is a percentage as defined below and throughput has units of kg·h$^{-1}$.

The term "screw speed", as used herein, may be understood to refer to the speed at which a screw rotates in a mixing device. A high screw speed as described herein may be understood to be of a value of at least around 300 rpm, such as at least around 350 rpm, or at least around 400 rpm, or at least around 450 rpm, or at least around 500 rpm. This term may refer to the speeds of more than one screw, such as when said mixing device is a twin-screw compounder.

The term "torque" is one of the art. When used herein in the context of a mixing device (e.g. a twin-screw compounder), the term "torque" refers to the torque applied to a material when said material is mixed by the mixing device. A high torque as described herein may be understood to be of a value of at least around 40%, such as at least around 45%, or at least around 50%. Torque is calculated herein as follows:

$$\text{torque} = \frac{\text{actual amperage arising from motor}}{\text{maximum amperage motor can develop}} \times 100\%$$

The term "shear", as used herein, may be understood to refer to a force applied parallel to a surface of a material. In a mixing device, this force may be experienced by the material when in contact with one or more screws during mixing of the material. A high shear, as used herein to describe mixing, may be understood to refer to a shear provided by a mixing device which is configured to provide a high specific mechanical energy, a high screw speed and/or a high torque, and/or wherein a high shear screw is used.

A "high shear screw", as used herein, may be understood to refer to a screw in a mixing device, wherein the screw has a shape which enables a high shear to be applied to a material during mixing. A "low shear screw", on the other hand, may be understood to refer to a screw in a mixing device, wherein the screw is of a shape that does not enable a high shear to be applied to a material during mixing. A skilled person would understand which screw shapes and designs give rise to high and low shear.

The term "filler", as used herein, may be understood to mean a particulate substance which is typically added to a product to provide extra bulk and/or to reduce the cost of the product. A filler may also function as a reinforcing additive and/or a stiffening agent.

The term "nanofiller", as used herein, may be understood to mean a filler in which the particles, on average, have at least one dimension that is from around 1 nm to around 1000 nm, optionally around 10 to 100 nm. Here, the average is a number average.

The term "reinforcing additive", as used herein, may be understood to mean a substance which is typically added to a product to improve one or more mechanical properties of the product, e.g. properties relating to strength and stiffness.

The term "lubricant", as used herein, may be understood to mean a substance which is typically added to a product to modify one or more mechanical properties of the product which are relevant to the extrusion and/or spinning processes discussed herein, e.g. properties relating to the melt processability such as reduced friction and reduced overheating.

The term "compatibilising agent", as used herein, may be understood to mean a substance which is typically added to a polymeric blend or mixed material to improve the miscibility of the polymers. Compatibilising agents may function for example by lowering the surface tension between the polymers, or by reactively cross-linking the polymers.

The term "product" as used herein is given a broad definition, and may be interpreted as a tool, container, implement, instrument, device, apparatus, gadget, appliance, machine, contraption, mechanism, aid, or the like. The product may be a coffee pod and/or a filter therefor. Coffee pods may be understood to be containers suitable for providing one or more measures of coffee (e.g. in the form of powder, granules, or the like; one "measure" being usable to produce a single serving of a coffee beverage from the coffee pod) for brewing in a suitable coffee machine.

The term "non-woven material" as used herein, may be understood to mean a sheet or web structure (e.g. a filter). The structure may be bonded together by entangling filaments (e.g. by mechanical entanglement, fluid entanglement, etc), thermally bonding, and/or chemically bonding.

The term "woven material" as used herein, may be understood to mean a product formed by multiple threads of material interlaced together (woven).

LIST OF TABLES AND FIGURES

Figure 1:
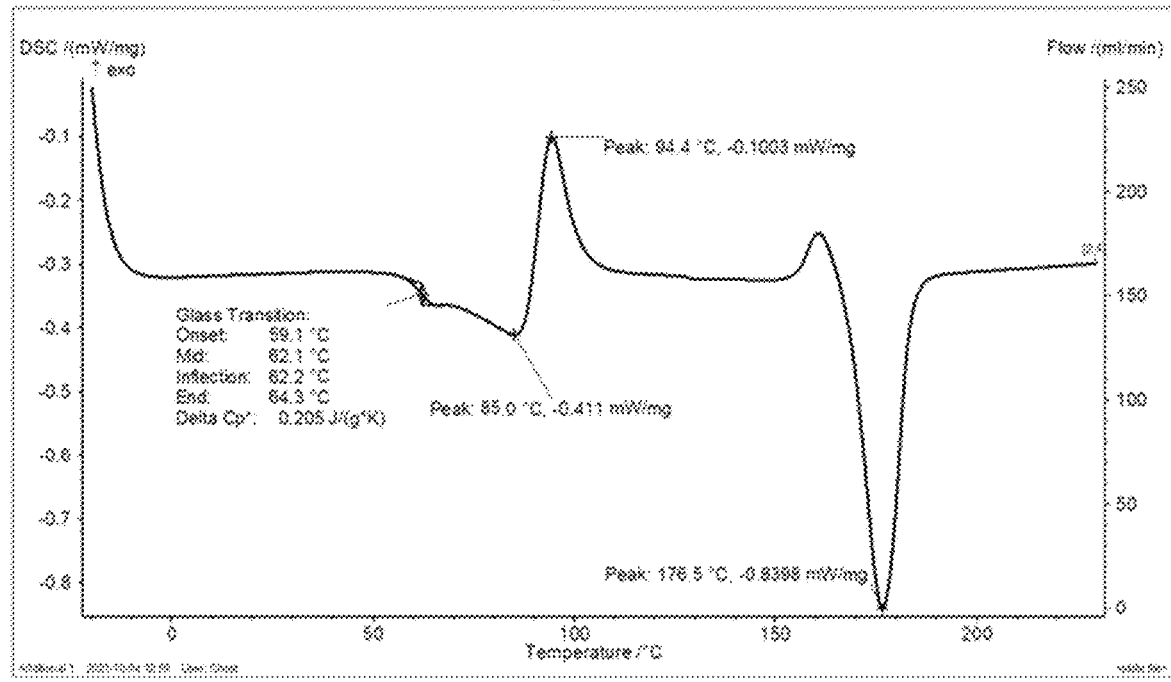

The disclosure will now be described with reference to the following Tables and Figures:

Table 1: results and parameters for home compostability and soil biodegradability tests Table 2: tensile properties of polymers, polymer blends and mixed materials Table 3: flexural properties of polymers, polymer blends and mixed materials Table 4: thermal properties of polymers, polymer blends and mixed materials Table 5: compounding and injection moulding parameters for PB4 polymeric blends FIG. 1: DSC curve for polymeric blend sample PB4 (1:4 PBSA to PLA by weight)

Figure 2:
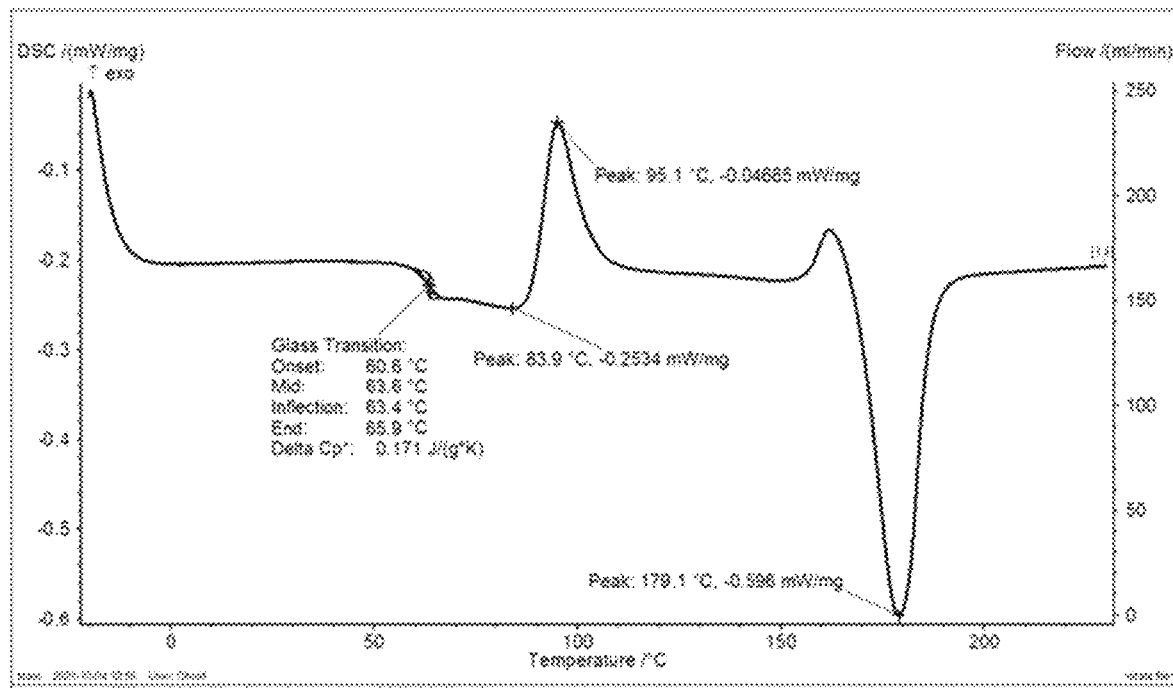

FIG. 2: DSC curve for polymeric blend sample PB1 (7:93 PBSA to PLA by weight)

FIG. 3: graph of flexural modulus of a mixed material against weight percentage of PB4 in the mixed material FIG. 3.1: graph of flexural modulus of a mixed material film against weight percentage of PB4 in the mixed material film FIG. 4: graphs of extensional viscosity of PBSA/PLA polymeric blends of varying PBSA:PLA weight ratios against shear rate FIG. 4.1: zoomed-in version of FIG. 4, showing the extensional viscosity of polymeric blends with lower PBSA:PLA weight ratios FIG. 5: graph of power applied to PB4 samples during compounding at varying screw speeds and with varying shear (9 kg h$^{-1}$ throughput)

Figure 6C:
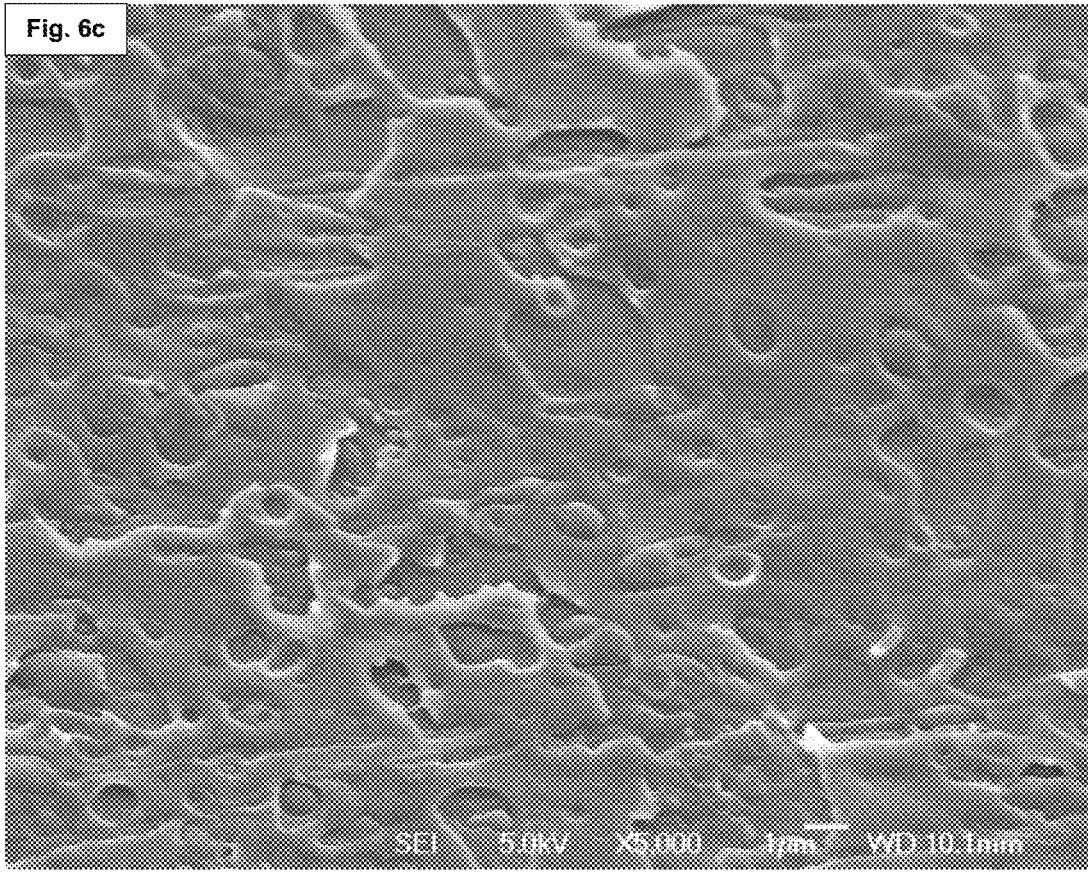
Figure 6D:
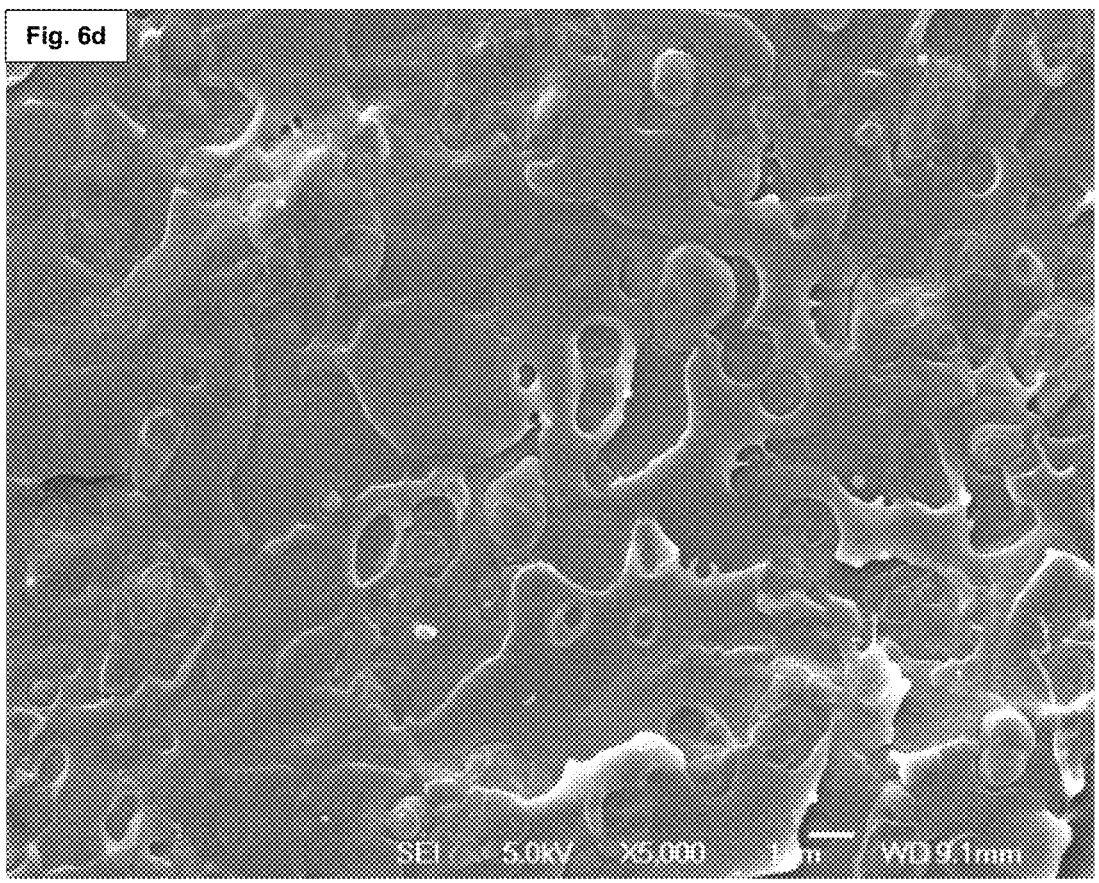
Figures 7, 7A:
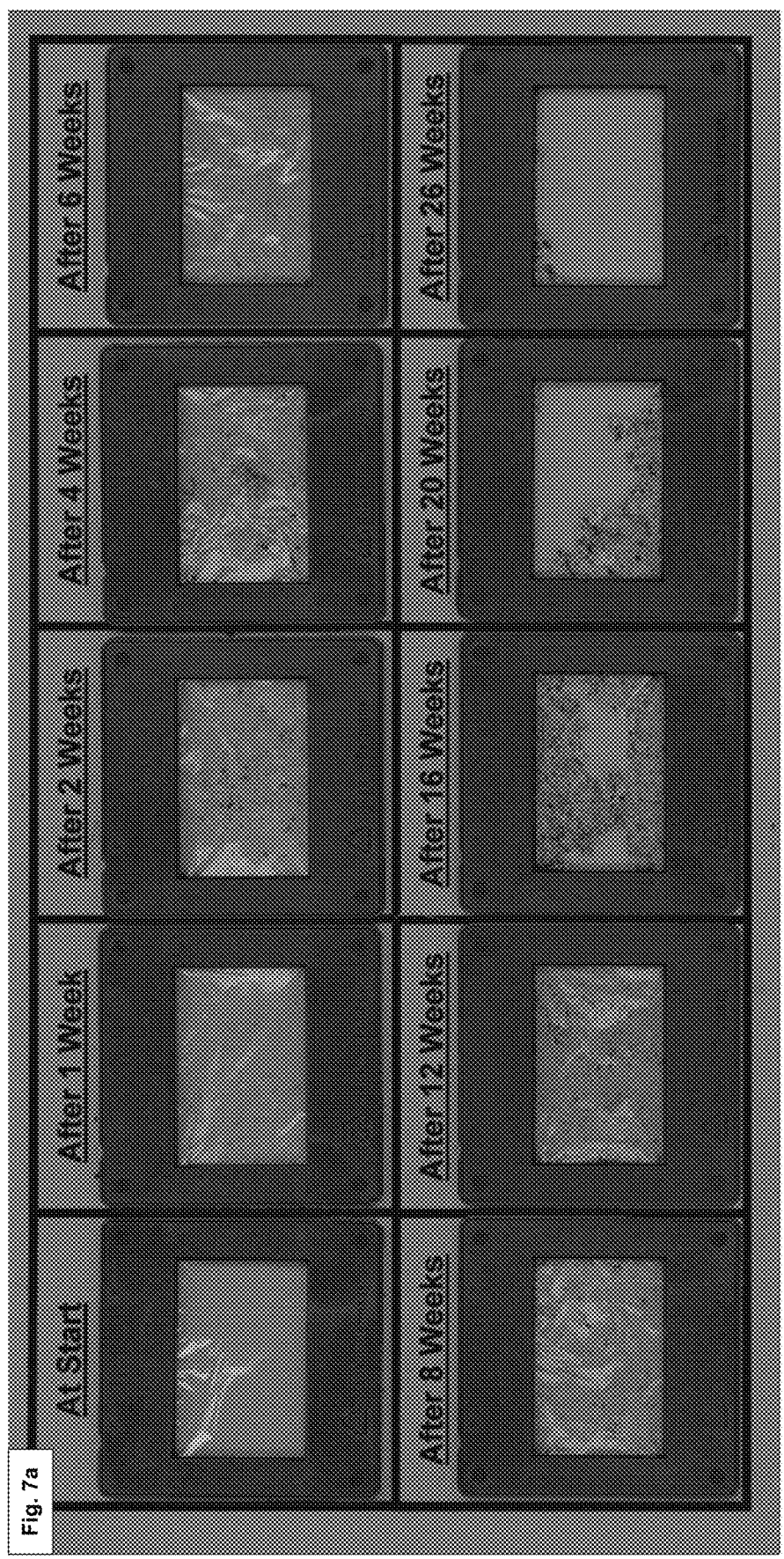

FIG. 6: SEM images showing the effects of screw speed and shear on the surface topology of PB4 samples FIG. 6a: PB4 compounded with low shear screws at 225 rpm FIG. 6b: PB4 compounded with high shear screws at 225 rpm FIG. 6c: PB4 compounded with high shear screws at 400 rpm FIG. 6d: PB4 compounded with high shear screws at 500 rpm FIG. 7: photographs showing the evolution of the disintegration of films comprising polymeric blends and mixed materials FIG. 7a: evolution of the disintegration of PB4

FIG. 7b: evolution of the disintegration of PB7

Figure 7C:
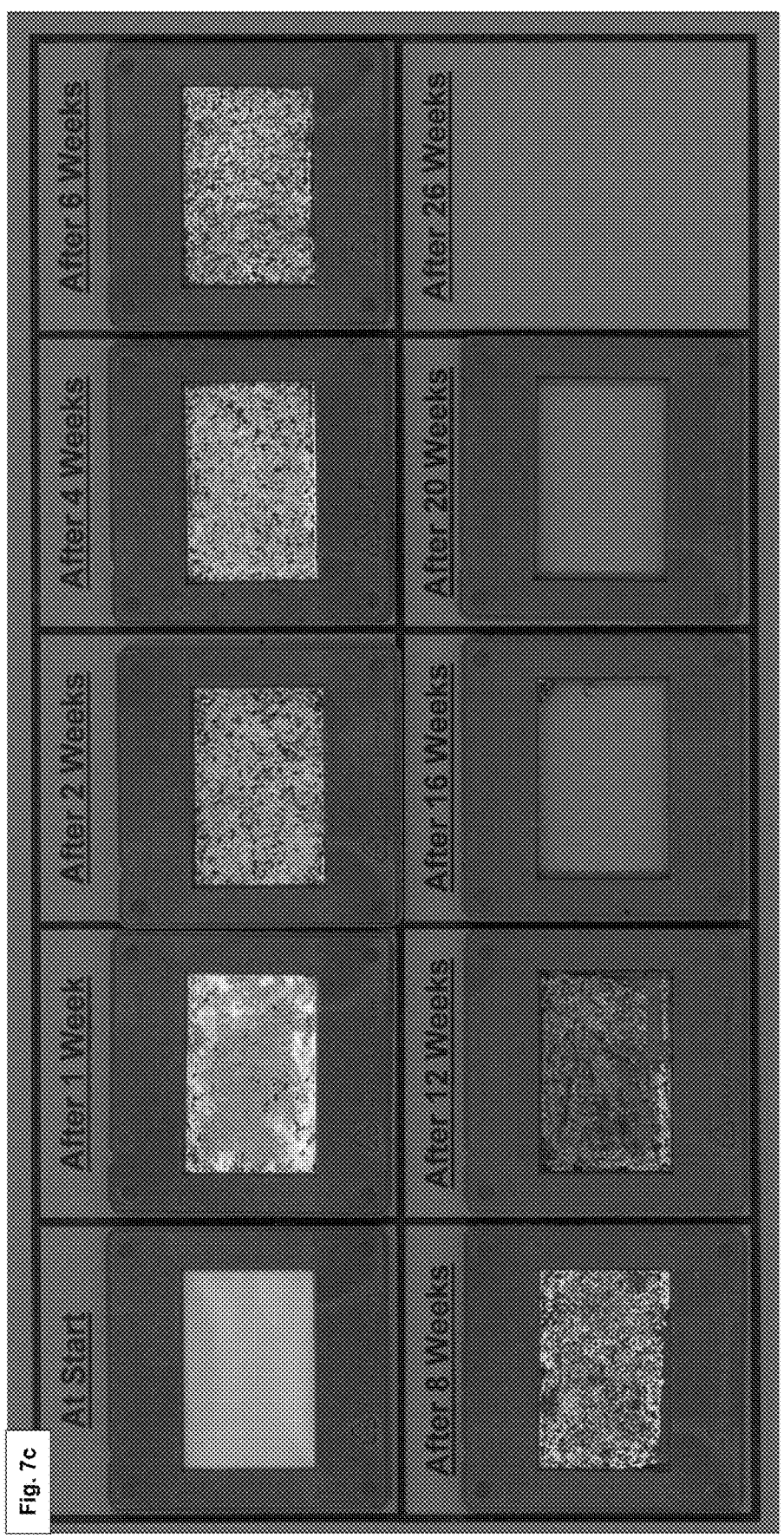

FIG. 7c: evolution of the disintegration of MM7

DETAILED DESCRIPTION

According to a first aspect of the present disclosure, there is provided a use of poly(butylene succinate co-adipate) (PBSA), mixed with a further substance comprising one or more polymers to form a polymeric blend, to improve the home compostability and/or soil biodegradability of the further substance comprising one or more polymers.

According to a second aspect, there is provided a method of improving the home compostability and/or soil biodegradability of a substance comprising one or more polymers, the method comprising mixing the substance comprising one or more polymers with poly(butylene succinate co-adipate) (PBSA) to form a polymeric blend.

It has been found that mixing with PBSA improves the biodegradability/compostability of substances comprising one or more polymers to the point where the overall polymeric blend (incorporating PBSA and the further substance comprising one or more polymers) meets standard requirements for home compostability and/or soil biodegradability. In other words, the biodegradability/compostability of the overall polymeric blend is higher than that of the constituent "further substance comprising one or more polymers".

Without wishing to be bound by theory, mixing with PBSA may reduce polymeric crystallinity in the overall polymeric blend; and/or the PBSA may plasticise the overall polymeric blend; and/or the end groups in PBSA may readily hydrolyse, producing acid which catalyses the breakdown of the remainder of the polymeric blend. Additional hydrolysis can form a key part of this breakdown (of the remainder) as well. Coupled/polymerised monomer units are hydrolysed during breakdown, resulting in release of monomers from the remaining polymer chains. This process can be catalysed by ambient or added enzymes, such as from microbes (e.g. polyesterase enzymes). Alternatively or additionally, since PBSA itself is home compostable, as it breaks down (composts), moisture and enzymes (e.g. from microorganisms) may be able to better penetrate the polymeric blend and further improve composting.

Features below relate to implementations of the uses and/or methods and/or products described and claimed herein. In the context of a use of a product, it will be appreciated that the relevant feature may be implemented in the product as a property (e.g. the polymeric blend may be home compostable and/or soil biodegradable) or an indication of provenance (e.g. "is or has been mixed at a specific mechanical energy"), etc. In the context of a method, it will be appreciated that the relevant feature may be implemented as an active step (e.g. "mixing at a specific mechanical energy"). All such implementations are intended to be encompassed and the skilled person will understand how to implement such features in the context of the given methods and/or uses and/or products described and claimed herein, mutatis mutandis. This applies regardless of the specific wording used herein. For example, if "the polymeric blend may be or may have been mixed with a material to form a mixed material" the skilled person will understand that the method may comprise an active step of mixing the polymeric blend with a material to form a mixed material.

The polymeric blend may be or may have been intimately mixed. Mixing may comprise intimately mixing. It has been found that intimate mixing further improves the home compostability and/or soil biodegradability of polymeric blends and enhances the processes discussed above. However, in some implementations, the polymeric blend is not or has not been intimately mixed.

The further substance comprising one or more polymers may comprise a polyester (optionally a biodegradable and/or compostable polyester) such that the polymeric blend comprises said PBSA and polyester. The polymeric blend optionally consists essentially of said PBSA and polyester. Said polyester may be poly(lactic acid) (PLA), which is a preferred implementation throughout the present disclosure.

In some implementations, PBSA is or has been mixed with the further substance comprising one or more polymers at high specific mechanical energy (e.g. high shear). The method may comprise mixing the PBSA and further substance comprising one or more polymers at high specific mechanical energy (e.g. high shear).

The polymeric blend may be or may have been mixed with a material to form a mixed material. In this context, the "material" may comprise PBAT and/or one or more further ingredients (such as a filler, a reinforcing additive, a lubricant, a compatibilising agent as described and claimed below). The method may comprise mixing the polymeric blend with a material to form a mixed material.

According to a third aspect, there is provided a use of a polymeric blend comprising poly(butylene succinate co-adipate) (PBSA) and a polyester (optionally a biodegradable and/or compostable polyester, such as PLA) as a stiffening agent for a material, wherein the polymeric blend and material collectively form a mixed material.

According to a fourth aspect, there is provided a method of stiffening a material, wherein the material is or has been mixed with a polymeric blend comprising poly(butylene succinate co-adipate) (PBSA) and a polyester (optionally a biodegradable and/or compostable polyester, such as PLA) to form a mixed material, wherein the mixed material has a higher stiffness than the material.

It has been found that a polymeric blend comprising PBSA and a polyester (such as PLA) can be used to stiffen a material (e.g. comprising PBAT) when mixed together to form a mixed material.

Features below relate to implementations of the uses and/or methods and/or products described and claimed herein (including the first, second, third and fourth aspects above, as well as other aspects below). For example, as above, the "material" of the third and fourth aspects may comprise PBAT and/or one or more further ingredients (such as a filler, a reinforcing additive, a lubricant, a compatibilising agent as described and claimed below) in the same way as the first and second aspects.

The mixed material may be or may have been intimately mixed. Mixing may comprise intimately mixing. It has been found that intimate mixing further improves the stiffening properties of the polymeric blend. Without wishing to be bound by theory, intimate mixing may lead to more frequent points of co-location and/or contact between the PBSA/polyester polymeric blend and the other material in the mixed material. In turn, this may lead to disruption of the flexibility of the other material. For example, if the other material is PBAT, then a PBAT polymeric chain may be less flexible (more stiff) if it is co-located/in contact with PBSA/polyester polymeric blend at numerous points (e.g. if PBSA is wrapped around PBAT, such as in a helical fashion). However, in some implementations, the mixed material is not or has not been intimately mixed.

In the third or fourth aspects, the polymeric blend may be home compostable and/or soil biodegradable, and optionally the mixed material may be home compostable and/or soil biodegradable. It will be appreciated that the methods and uses described and claimed herein provide for polymeric blends and/or mixed materials having improved biodegradability/compostability and/or stiffness. Both may be achieved concurrently. In other words, the first & second aspects (biodegradability/compostability) and the third & fourth aspects (stiffness) can combine, as can optional implementations described and claimed herein).

The mixed material may comprise said PBSA and, when present, said polyester (optionally a biodegradable and/or compostable polyester, such as PLA). In some implementations, the mixed material comprises poly(butylene adipate-co-terephthalate) (PBAT) as the "material". The mixed material may consist essentially of said PBSA, polyester when present and PBAT. PBAT may be understood as providing a main component in the mixed material (e.g. a main structural component). PBAT-based mixed materials particularly benefit from the biodegradability/compostability and/or stiffening benefits discussed herein.

The levels of PBAT will depend on the end use of the mixed material (e.g. the product comprising it). The mixed material may comprise at least around 1 wt % PBAT, optionally at least around 5 wt % PBAT, optionally at least around 10 wt % PBAT, optionally at least around 15 wt % PBAT, optionally at least around 20 wt %, optionally at least around 25 wt %, optionally at least around 30 wt %, optionally at least around 35 wt %, optionally at least around 40 wt %, optionally at least around 45 wt %, optionally at least around 50 wt %, optionally at least around 55 wt %, optionally at least around 60 wt %, optionally at least around 65 wt %, optionally at least around 70 wt %, optionally at least around 75 wt %, optionally around 75 wt %, based on the total weight of the mixed material.

If a mixed material is described as comprising "at least around 15 wt % PBAT, based on the total weight of the mixed material", this means that, for example, 100 g of mixed material comprises at least around 15 g PBAT.

The mixed material may comprise at most around 80 wt % PBAT, optionally at most around 75 wt %, optionally at most around 70 wt %, optionally at most around 65 wt %, optionally at most around 60 wt %, optionally at most around 55 wt %, optionally at most around 50 wt %, optionally at most around 45 wt %, optionally at most around 40 wt %, optionally at most around 35 wt %, optionally at most around 30 wt %, optionally at most around 25 wt %, based on the total weight of the mixed material.

The mixed material may comprise around 1 to 80 wt % PBAT, optionally around 5 to 80 wt % PBAT, optionally around 10 to 80 wt % PBAT, optionally around 15 to 80 wt % PBAT, optionally around 20 to 60 wt %, optionally around 25 to 50 wt %, based on the total weight of the mixed material.

The mixed material may comprise at least around 7.5 wt % polyester (optionally a biodegradable and/or compostable polyester, such as PLA), optionally at least around 10 wt %, optionally at least around 12.5 wt %, optionally at least around 20 wt %, optionally at least around 25 wt %, optionally at least around 30 wt %, optionally at least around 35 wt %, optionally at least around 40 wt %, based on the total weight of the mixed material.

The mixed material may comprise multiple components/ingredients (e.g. PBSA, polyester and PBAT) at the wt % ranges highlighted herein. In such cases, it will be understood that the wt % balance in the mixed material cannot exceed 100%. The skilled person will be able to select the amounts of each component in the mixed material depending on the desired properties, e.g. depending on the end use of the mixed material (such as the product comprising it).

The mixed material may comprise comprises at most around 50 wt % polyester (optionally a biodegradable and/or compostable polyester, such as PLA), optionally at most around 45 wt %, optionally at most around 40 wt %, optionally at most around 35 wt %, optionally at most around 30 wt %, optionally at most around 25 wt %, optionally at most around 20 wt %, optionally at most around 15 wt %, based on the total weight of the mixed material.

The mixed material may comprise around 7.5 to 50 wt % polyester (optionally a biodegradable and/or compostable polyester, such as PLA), optionally around 15 to 45 wt %, optionally around 20 to 40 wt %, optionally around 20 to 30 wt %, based on the total weight of the mixed material.

The mixed material may comprise at least around 0.4:1 PBAT to polyester (optionally a biodegradable and/or compostable polyester, such as PLA), optionally at least around 0.75:1, optionally at least around 1:1, optionally at least around 1.25:1, optionally at least around 2:1, optionally at least around 2.5:1, optionally at least around 4:1, optionally at least around 5:1, based on the weights of said PBAT and polyester (e.g. PLA).

The mixed material may comprise at most around 5:1 PBAT to polyester (optionally a biodegradable and/or compostable polyester, such as PLA), optionally at most around 4:1, optionally at most around 2.5:1, optionally at most around 2:1, optionally at most around 1.25:1, optionally at most around 1:1, optionally at most around 0.75:1, based on the weights of said PBAT and polyester (e.g. PLA).

The mixed material may comprise around 0.4:1 to 5:1 PBAT to polyester (optionally a biodegradable and/or compostable polyester, such as PLA), optionally around 1:1 to 5:1, optionally around 2:1 to 5:1, optionally around 2.5:1 to 5:1, based on the weights of said PBAT and polyester (e.g. PLA).

The mixed material may comprise at least around 5 wt % of the polymeric blend, optionally at least around 10 wt %, optionally at least around 15 wt %, optionally at least around 25 wt %, optionally at least around 35 wt %, based on the total weight of the mixed material. It will be appreciated that the remainder of the mixed material (i.e. the non-polymeric blend component) comprises (e.g. consists essentially of and optionally consists of) said other "material" (e.g. PBAT and/or more further ingredients such as a filler, a reinforcing additive, a lubricant, a compatibilising agent as described and claimed herein).

The mixed material may comprise at most around 99 wt % of the polymeric blend, optionally at most around 95 wt %, optionally at most around 80 wt %, optionally at most around 70 wt %, optionally at most around 65 wt %, optionally at most around 60 wt %, optionally at most around 55 wt %, based on the total weight of the mixed material.

The mixed material may comprise around 99 wt % of the polymeric blend, optionally around 5 to 95 wt %, optionally around 5 to 80 wt %, optionally around 10 to 70 wt %, optionally around 15 to 65 wt %, optionally around 20 to 55 wt %, based on the total weight of the mixed material.

The mixed material may comprise at least around 5 wt % of one or more further ingredients, optionally at least around 10 wt %, optionally at least around 15 wt %, optionally at least around 20 wt %, optionally at least around 25 wt %, based on the total weight of the mixed material.

The mixed material may comprise at most around 30 wt % of one or more further ingredients, optionally at most around 25 wt %, optionally at most around 20 wt %, optionally at most around 15 wt %, optionally at most around 10 wt %, based on the total weight of the mixed material.

The mixed material may comprise around 5 to 30 wt % of one or more further ingredients, optionally around 15 to 30 wt %, optionally around 20 to 30 wt %, optionally around 25 wt %, based on the total weight of the mixed material.

The one or more further ingredients in the mixed material may comprise a filler. The filler may be an inorganic filler, such as a metal hydroxide or carbonate (optionally hydroxide), optionally magnesium hydroxide or calcium carbonate. The inorganic filler may be silica, talc, wollastonite or a nanofiller. The filler may also be an organic filler. The organic filler may be a flour, a native starch, a cellulosic powder or a nanofiller.

The filler may be present in the mixed material at around 1 to 50 wt % (e.g. around 5 to 10 wt %, optionally around 6 to 9 wt %, optionally around 8 wt %), optionally around 10 to 40 wt % (e.g. around 15 to 35 wt %, optionally around 20 to 30 wt %, optionally around 25 wt %), optionally around 20 to 30 wt %, based on the total weight of the mixed material.

The one or more further ingredients in the mixed material may comprise a lubricant, optionally wherein the lubricant is an amphiphile, optionally wherein the lubricant is a non-ionic amphiphile. The lubricant may be a stearate, such as a sorbitan ester or glycerol monostearate, optionally wherein the sorbitan ester is sorbitan monostearate. The lubricant may also be selected from fatty acids, fatty acid esters, fatty acid amides, polyolefin wax derivatives and natural waxes.

When the lubricant is an amphiphile, it is believed (without wishing to be bound by theory) that the hydrophilic end of the amphiphile has an affinity for the polymers in the mixed material, and the hydrophobic end orients itself in a way that reduces friction between the polymers and the barrel, screw, die and/or mould, when these components are present during the mixing process.

The lubricant may be present in the mixed material at around 0.1 to 3 wt %, optionally around 0.25 to 2 wt %, and optionally around 0.5 to 1.5 wt %, optionally around 0.75 to 1.25 wt %, optionally around 0.85 to 1.15 wt %, optionally around 1 wt %, based on the total weight of the mixed material.

The one or more further ingredients in the mixed material may comprise a reinforcing additive, optionally wherein the reinforcing additive is a fibrous reinforcing additive. The fibrous reinforcing additive may be an inorganic fibrous reinforcing additive; optionally hemp, flax or cellulose. The fibrous reinforcing additive may be an organic fibrous reinforcing additive; optionally glass or carbon.

The reinforcing additive may be present in the mixed material at around 1 to 50 wt %, optionally around 10 to 40 wt %, and optionally around 20 to 30 wt %, based on the total weight of the mixed material.

The one or more further ingredients in the mixed material may comprise a compatibilising agent, optionally wherein the compatibilising agent is an amphiphile. The amphiphile may be a fatty acid, a fatty acid ester, a phospholipid, a copolymer with varying hydrophobicity regions or a plasticiser with varying hydrophobicity regions. The compatibilising agent may be an aliphatic polyester. The compatibilising agent may be a cross-linking agent (cross-linking polymers in the mixed material). The cross-linking agent may be a hydrogen bond-forming agent (such as a dicarboxylic acid or a dialcohol) or a covalent bond-forming agent (such as a maleated copolymer, a peroxide or an isocyanate).

A compatibilising agent may be useful to improve the miscibility of the polymers in the mixed material, for example by lowering the surface tension between the polymers, or by reactively cross-linking the polymers. By compatibilising the polymers, fillers or other ingredients of a mixed material, the transfer of energy between the polymers, fillers and/or other ingredients will improve, reducing the risk of early failures during processing or during usage.

The compatibilising agent may be present in the mixed material at around 0.01 to 5 wt %, optionally around 0.1 to 4 wt %, and optionally around 1 to 3 wt %, based on the total weight of the mixed material.

The mixed material may have a flexural modulus at least around 50% higher than that of the material, optionally at least around 100% higher, optionally at least around 500% higher, optionally at least around 1000% higher, optionally at least around 2000% higher.

The mixed material may have a flexural modulus of at least around 350 MPa, optionally at least around 500 MPa, optionally at least around 600 MPa, optionally at least around 700 MPa, optionally at least around 1000 MPa.

The mixed material may have a flexural modulus of at most around 9000 MPa, optionally at most around 7000 MPa, optionally at most around 6000 MPa, optionally at most around 5000 MPa, optionally at most around 4000 MPa, optionally at most around 3000 MPa.

The mixed material may have a flexural modulus of around 350 to 9000 MPa, optionally around 500 to 7000 MPa, optionally around 600 to 6000 MPa, optionally 700 to 5000 MPa, optionally around 1000 to 3000 MPa.

Said mixing may be at, or the PBSA and further substance comprising one or more polymers may be or may have been mixed at, a specific mechanical energy of at least around 0.10 kW·h·kg$^{-1}$, optionally at least around 0.20 kW·h·kg$^{-1}$, optionally at least around 0.25 kW·h·kg$^{-1}$, optionally at least around 0.28 kW·h·kg$^{-1}$, optionally at least around 0.30 kW·h·kg$^{-1}$. For example, the method may involve a mixer which is configured to provide a given specific mechanical energy (e.g. through selection and application of screw speed, screw design, torque, shear, etc. as is well-understood by those of skill in the art). Such specific mechanical energy may bring about intimate mixing as described and claimed herein.

Said mixing may be at, or the PBSA and further substance comprising one or more polymers may be or may have been mixed at, a specific mechanical energy of at most around 1.00 kW·h·kg$^{-1}$.

Said mixing may be at, or the PBSA and further substance comprising one or more polymers may be or may have been mixed at, a specific mechanical energy of around 0.10 to 1.00 kW·h·kg$^{-1}$, optionally around 0.20 to 1.00 kW·h·kg$^{-1}$, optionally around 0.25 to 1.00 kW·h·kg$^{-1}$, optionally around 0.28 to 1.00 kW·h·kg$^{-1}$, optionally around 0.30 to 1.00 kW·h·kg$^{-1}$.

Said mixing may comprise, or the PBSA and further substance comprising one or more polymers may be or may have been mixed with, a screw mixer rotating at a screw speed of at least around 225 rpm, optionally at least around 300 rpm, optionally at least around 350 rpm.

Said mixing may comprise, or the PBSA and further substance comprising one or more polymers may be or may have been mixed with, a screw mixer rotating at a screw speed of at most around 1000 rpm.

Said mixing may comprise, or the PBSA and further substance comprising one or more polymers may be or may have been mixed with, a screw mixer rotating at a screw speed of around 225 to 1000 rpm, optionally around 300 to 1000 rpm, optionally around 350 to 1000 rpm.

Said mixing may be at or the PBSA and further substance comprising one or more polymers may be or may have been mixed at, a torque of at least around 40%, optionally at least around 45%, optionally at least around 50%.

Said mixing may be at or the PBSA and further substance comprising one or more polymers may be or may have been mixed at, a torque of at most around 80%, optionally at most around 75%, optionally at most around 70%.

Said mixing may be at or the PBSA and further substance comprising one or more polymers may be or may have been mixed at, a torque of around 40 to 80%, optionally around 45 to 75%, optionally around 50 to 70%.

The polymeric blend may comprise at least around 1 wt % PBSA, optionally at least around 2 wt %, optionally at least around 5 wt %, optionally at least around 10 wt %, optionally at least around 20 wt %, optionally at least around 30 wt %, optionally at least around 40 wt %, based on the total polymeric content in the polymeric blend. As an example, if 100 g of a polymeric blend is described as comprising around 1 wt % PBSA (based on the total polymeric content in the polymeric blend), then the polymeric blend will comprise around 1 g of PBSA and around 99 g of other polymeric content, such as PLA.

The polymeric blend may comprise at most around 75 wt % PBSA, optionally at most around 65 wt %, optionally at most around 50 wt %, optionally at most around 40 wt %, optionally at most around 30 wt %, optionally at most around 20 wt %, optionally at most around 15 wt %, optionally at most around 7 wt % (e.g. around 7 wt %), optionally at most around 5 wt %, based on the total polymeric content in the polymeric blend.

The polymeric blend may comprise around 1 to 75 wt % PBSA, optionally around 2 to 65 wt % (e.g. around 2 to 10 wt %), optionally around 5 to 50 wt %, optionally around 10 to 40 wt %, based on the total polymeric content in the polymeric blend.

The polymeric blend may comprise at least around 60 wt % of the said "further substance comprising one or more polymers", optionally at least around 70 wt %, optionally at least around 80 wt %, optionally at least around 90 wt %, optionally at least around 93 wt %, optionally around 93 wt %, based on the total polymeric content in the polymeric blend; optionally wherein said further substance comprising one or more polymers is polyester (optionally a biodegradable and/or compostable polyester, such as PLA).

It has been found that polymeric blends with the PBSA and/or polyester (e.g. PLA) wt % values described, claimed and exemplified herein are particularly favourable in terms of their biodegradability/compostability, stiffness and/or melt spinnability.

The polymeric blend may comprise at most around 99 wt % further substance comprising one or more polymers, optionally at most around 98 wt %, optionally at most around 95 wt %, optionally at most around 90 wt %, optionally at most around 80 wt %, optionally at most around 70 wt %, based on the total polymeric content in the polymeric blend; optionally wherein said further substance comprising one or more polymers is polyester (optionally a biodegradable and/or compostable polyester, such as PLA).

Where a polymer in a polymeric blend is described as comprising "at most" a particular wt %, the wt % values of all polymeric components in the polymeric blend must add up to 100 wt %. For example, if a polymeric blend comprises at most around 75 wt % PBSA, then the actual wt % values of all other polymeric components (e.g. PLA) cannot add up to more than 100 wt % (or less than 100 wt %).

The polymeric blend may comprise around 60 to 99 wt % further substance comprising one or more polymers, optionally around 70 to 98 wt %, optionally around 80 to 95 wt %, optionally around 90 to 93 wt %, based on the total polymeric content in the polymeric blend; optionally wherein said further substance comprising one or more polymers is polyester (optionally a biodegradable and/or compostable polyester, such as PLA).

The polymeric blend may comprise:
  around 1 to 40 wt % PBSA, optionally around 2 to 35 wt % (e.g. around 2 to 10 wt %), optionally around 5 to 30 wt %, optionally around 10 to 25 wt %, based on the total polymeric content in the polymeric blend; and
  around 60 to 99 wt % further substance comprising one or more polymers, optionally around 65 to 98 wt %, optionally around 70 to 95 wt %, optionally around 75 to 90 wt %, based on the total polymeric content in the polymeric blend; optionally wherein said further substance comprising one or more polymers is polyester (optionally a biodegradable and/or compostable polyester, such as PLA).

The polymeric blend may comprise at least around 1:99 PBSA to further substance comprising one or more polymers, optionally at least around 5:95, optionally at least around 7:93 (e.g. around 7:93), based on the weights of PBSA and further substance comprising one or more polymers and wherein the sum of integers in the ratio is 100; optionally wherein said further substance comprising one or more polymers is polyester (optionally a biodegradable and/or compostable polyester, such as PLA).

For example, a polymeric blend described as comprising "at least around 1:99 PBSA to further substance comprising one or more polymers, based on the weights of PBSA and further substance comprising one or more polymers and wherein the sum of integers in the ratio is 100" means that a ratio described or claimed as such may have values such as 1:99, or 2:98, or 3:97. This would mean that, for example, 100 g of said polymeric blend would comprise of at least around 1 g of PBSA and at most around 99 g of further substance comprising one or more polymers, or at least 2 g of PBSA and at most 98 g of further substance comprising one or more polymers, or at least 3 g of PBSA and at most 97 g of further substance comprising one or more polymers.

The polymeric blend may comprise at most around 10:90 PBSA to further substance comprising one or more polymers, optionally at most around 7:93, optionally at most around 5:96, optionally around 1:99, based on the weights of PBSA and further substance comprising one or more polymers and wherein the sum of integers in the ratio is 100; optionally wherein said further substance comprising one or more polymers is polyester (optionally a biodegradable and/or compostable polyester, such as PLA).

The polymeric blend may comprise around 1:99 to 10:90 PBSA to further substance comprising one or more polymers, optionally around 5:95 to 10:90, optionally around 5:95 to 7:93, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

The polymeric blend may comprise at least around 15:85 PBSA to further substance comprising one or more polymers, optionally at least around 20:80, optionally at least around 35:65, optionally at least around 40:60, optionally around 40:60, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

The polymeric blend may comprise at most around 40:60 PBSA to further substance comprising one or more polymers, optionally at most around 35:65, optionally at most around 20:80, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

The polymeric blend may comprise around 15:85 to 40:60 PBSA to further substance comprising one or more polymers, optionally around 20:80 to 40:60, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

The polymeric blend may comprise PLA having a D-isomer content of at least around 0.1 wt %, optionally at least around 0.25 wt %, and optionally at least around 0.5 wt %, based on the total PLA content (D to L) in the polymeric blend. It has been found that polymeric blends comprising PLA wherein the PLA has a D-isomer content in these ranges are particularly favourable as stiffening agents. Without wishing to be bound by theory, a low D-isomer content typically confers high crystallinity in the PLA (all other factors being equal). This may result in PLA polymers with low mobility and/or flexibility, and hence a high stiffness.

The polymeric blend may comprise PLA having a D-isomer content of at most around 16 wt %, optionally at most around 10 wt %, optionally at most around 5 wt %, optionally around 1 wt %, based on the total PLA content (D to L) in the polymeric blend.

The polymeric blend may comprise PLA having a D-isomer content of around 0.1 to 16 wt % (e.g. around 0.5 wt %), optionally around 0.25 to 10 wt %, optionally around 0.5 to 5 wt %, optionally around 0.5 to 1 wt %, based on the total PLA content (D to L) in the polymeric blend.

The polymeric blend may be melt spinnable (e.g. in a monofilament or multi-filament process, optionally as described or claimed herein). Mixed materials described and claimed herein may similarly be melt spinnable.

The polymeric blend may have an extensional viscosity of at most around 5 kPa·s, optionally at most around 4 kPa·s, optionally at most around 3.5 kPa·s, optionally at most around 3 kPa·s. It has been found that polymeric blends with extensional viscosities in these ranges are suitable for spinning. Without wishing to be bound by theory, this may be because polymeric blends with higher extensional viscosities are difficult to draw into filaments, and polymeric blends with lower extensional viscosities may draw too easily and lead to filament breakage.

The polymeric blend may have an extensional viscosity of at least around 0.5 kPa·s, optionally at least around 0.75 kPa·s, optionally at least around 0.9 kPa·s, optionally at least around 1 kPa·s.

The polymeric blend may have an extensional viscosity of around 0.5 to 5 kPa·s, optionally around 0.75 to 4 kPa·s, optionally around 0.9 to 3.5 kPa·s, optionally around 1 to 3 kPa·s.

It has been found that polymeric blends comprising PBSA and polyester (e.g. PLA) are melt spinnable at weight ratios below around 20:80, optionally below around 19:81, optionally below around 18:82, optionally below around 17:93 (PBSA: polyester (e.g. PLA)). The extensional viscosity of these melt spinnable blends may be at most around 5 kPa·s, optionally at most around 4 kPa·s, optionally at most around 3.5 kPa·s, optionally at most around 3 kPa·s.

In some implementations, the polymeric blends above are also found to be suitable for processing techniques such as extrusion coating, film extrusion, sheet extrusion, injection moulding and the like.

In the use or method, at least around 80 to 100 wt % of said PBSA may be unbranched, optionally around 85 to 95 wt %, optionally around 90 wt %.

In the use or method, at least around 80 to 100 wt % of said PBSA may be not cross-linked, optionally around 85 to 95 wt %, optionally around 90 wt %.

According to a fifth aspect, there is provided a product comprising a polymeric blend comprising polyester (optionally a biodegradable and/or compostable polyester, such as PLA) and poly(butylene succinate co-adipate) (PBSA), wherein:
  the polymeric blend is home compostable and/or soil biodegradable; and/or
  the polymeric blend has a flexural modulus greater than around 2000 MPa (optionally wherein the polymeric blend is as defined above),
  optionally wherein the product comprises a mixed material as defined above.

Said polyester (optionally a biodegradable and/or compostable polyester, such as PLA) and PBSA may be present in an amount as defined above.

Said polymeric blend may have a Young's modulus of at least around 500 MPa, optionally at least around 750 MPa, optionally at least around 1000 MPa, optionally at least around 1250 MPa.

Said polymeric blend may have a Young's modulus of at most around 1500 MPa, optionally at most around 1400 MPa, optionally at most around 1300 MPa, optionally at most around 1200 MPa, optionally at most around 1100 MPa, optionally at most around 1000 MPa.

Said polymeric blend may have a Young's modulus of around 500 to 1500 MPa, optionally around 750 to 1400 MPa, optionally around 1000 to 1400 MPa.

Said polymeric blend may have a flexural modulus of at least around 2250 MPa, optionally at least around 2500 MPa, optionally at least around 3000 MPa, optionally at least around 3500 MPa.

Said polymeric blend may have a flexural modulus of at most around 4000 MPa, optionally at most around 3750 MPa, optionally at most around 3500 MPa, optionally at most around 3000 MPa, optionally at most around 2500 MPa, optionally at most around 2000 MPa.

Said polymeric blend may have a flexural modulus of around 2250 to 4000 MPa, optionally around 2500 to 3750 MPa, optionally around 3000 to 3750 MPa.

The product may comprise a polymeric blend as described above. The polymeric blend may be or may have been mixed with one or more further ingredients to form a mixed material as defined above.

According to a sixth aspect, there is provided a product formable by the methods above (e.g. according to the first, second, third or fourth aspects), optionally wherein said product is formed by said method.

The polymeric blend may be or may have been mixed with one or more further ingredients to form a mixed material comprising:
  around 10 to 60 wt % polymeric blend of PBSA and PLA,
  around 10 to 60 wt % PBAT,
  around 0.5 to 1.5 wt % lubricant, optionally around 0.8 to 1.2 wt %, optionally around 1 wt %, optionally wherein said lubricant is sorbitan monostearate,
  wherein wt % is based on the total weight of the mixed material; and
  wherein the polymeric blend comprises:
    around 5:95 to 30:70 PBSA to PLA, based on the weights of PBSA and PLA in the polymeric blend.

The polymeric blend may be or may have been mixed with one or more further ingredients to form a mixed material comprising:
  around 10 to 60 wt % polymeric blend of PBSA and PLA,
  around 10 to 60 wt % PBAT,
  around 20 to 30 wt % filler, optionally around 23 to 27 wt %, optionally around 25 wt %, optionally wherein said filler is talc,
  around 0.5 to 1.5 wt % lubricant, optionally around 0.8 to 1.2 wt %, optionally around 1 wt %, optionally wherein said lubricant is sorbitan monostearate,
  wherein wt % is based on the total weight of the mixed material; and
  wherein the polymeric blend comprises:
    around 5:95 to 30:70 PBSA to PLA, based on the weights of PBSA and PLA in the polymeric blend.

The polymeric blend may be or may have been mixed with one or more further ingredients to form a mixed material comprising:
  around 20 to 50 wt % polymeric blend of PBSA and PLA,
  around 20 to 50 wt % PBAT,
  around 20 to 30 wt % filler, optionally around 23 to 27 wt %, optionally around 25 wt %, optionally wherein said filler is talc,
  around 0.5 to 1.5 wt % lubricant, optionally around 0.8 to 1.2 wt %, optionally around 1 wt %, optionally wherein said lubricant is sorbitan monostearate,
  wherein wt % is based on the total weight of the mixed material; and wherein the polymeric blend comprises:
    around 10:90 to 25:75 PBSA to PLA, based on the weights of PBSA and PLA in the polymeric blend.

The mixed material may comprise:
  around 20:80 PBSA to PLA, based on the weights of PBSA and PLA in the mixed material.

The mixed material may comprise:
  around 80:20 PBAT to PLA, based on the weights of PBAT and PLA in the mixed material.

In the product, use or method, said polymeric blend may be or may have been mixed at a temperature of around 50 to 300° C., optionally around 75 to 250° C., optionally around 100 to 225° C., optionally around 140 to 200° C.

The product may be a home compostable and/or soil biodegradable product selected from a spun fibre, a bag, a food or drink package, a food or drink utensil, a coffee brewing pod, a woven or non-woven material (optionally comprising spun fibres), a filter, a film (e.g. an agricultural film, such as a mulch film) and a wrapping material (e.g. a food wrapping material or a plant wrapping material, such as a tree guard). It has been found that polymeric blends and mixed materials with the parameters described above have particularly favourable properties for these products, the properties including for example home compostability, soil biodegradability, high stiffness and/or melt spinnability.

According to a seventh aspect, there is provided a use of poly(butylene succinate co-adipate) (PBSA), mixed with a further substance comprising one or more polymers to form a polymeric blend, to improve the home compostability and/or soil biodegradability of the further substance comprising one or more polymers;
wherein the PBSA is or has been provided as a masterbatch, wherein the masterbatch comprises PBSA diluted with a further substance comprising one or more polymers;
preferably wherein said PBSA is mixed by extrusion;
optionally wherein the further substance comprising one or more polymers is the same further substance comprising one or more polymers as that described above;
optionally wherein said use is as described in any of the preceding paragraphs.

According to an eighth aspect, there is provided a method of improving the home compostability and/or soil biodegradability of a substance comprising one or more polymers, the method comprising mixing the substance comprising one or more polymers with poly(butylene succinate co-adipate) (PBSA) to form a polymeric blend;
wherein the PBSA is provided as a masterbatch prior to said mixing, wherein the masterbatch comprises PBSA diluted with a further substance comprising one or more polymers;
preferably wherein said mixing is by extrusion;
optionally wherein the further substance comprising one or more polymers is the same further substance comprising one or more polymers as that described above;
optionally wherein said method is as described in any of the preceding paragraphs.

PBSA is known to have a relatively low melting point. As a result, introducing PBSA directly to some extrusion machines can lead to excessive pre-melting. Pre-melted polymer can cause slip at the screw and barrel surfaces, leading to varying material conveying and inconsistent die pressures, giving rise to inconsistent spinning. It has been found that providing the PBSA as a masterbatch prior to adding the PBSA to an extrusion machine helps to avoid this issue.

The further substance comprising one or more polymers used to dilute the masterbatch may be the same or different to the further substance comprising one or more polymers used in said mixing step. Therefore, features discussed above in the context of said further substance comprising one or more polymers may equally apply to said further substance comprising one or more polymers in the context of said masterbatch.

The masterbatch may comprise at least around 5 wt % PBSA, optionally at least around 10 wt %, optionally at least around 15 wt %, optionally at least around 20 wt %, optionally at least around 30 wt %, optionally at least around 40 wt %, optionally at least around 50 wt %, based on the total polymeric content in the masterbatch.

The masterbatch may comprise at most around 75 wt % PBSA, optionally at most around 65 wt %, optionally at most around 50 wt %, optionally at most around 40 wt %, optionally at most around 35 wt %, optionally at most around 33 wt %, optionally at most around 30 wt %, based on the total polymeric content in the masterbatch.

The masterbatch may comprise around 25 to 50 wt % PBSA, optionally around 28 to 40 wt %, optionally around 30 to 35 wt %, optionally around 33 wt %, based on the total polymeric content in the masterbatch.

EXAMPLES

Example 1: Formation of Intimately Mixed Polymeric Blends Comprising PBSA and PLA A series of polymeric blends comprising different weight percentages (given below) of PBSA (MCPP-PTT Bio-PBS™ FD92PM) and PLA (NatureWorks Ingeo™ Biopolymer 6100D, D-isomer content 0.5%) were mixed in a Thermo Scientific™ TSE 24 MC Twin-screw Extruder.

The PBSA and PLA were pre-dried and fed into the compounder using gravimetric feeders. The throughput was kept constant. The compounder was set to a temperature profile ranging from 140 to 200° C. and configured to provide intimate mixing. The screw speed was set to 500 rpm.

Although intimately mixed polymeric blends were formed in this example, a similar process can be used to form otherwise mixed polymeric blends (e.g. by using a lower screw speed).

|  | Sample ID | | | | |
| --- | --- | --- | --- | --- | --- |
| Component | PB1 | PB3 | PB4 | PB5 | PB6 |
| PLA wt % | 93 | 85 | 80 | 70 | 60 |
| PBSA wt % | 7 | 15 | 20 | 30 | 40 |
| PLA weight/kg | 6.51 | 5.95 | 5.6 | 4.9 | 4.2 |
| PBSA weight/kg | 0.49 | 1.05 | 1.4 | 2.1 | 2.8 |

Example 1.1: Formation of Various Physical Forms of a Polymeric Blend Comprising PBSA and PLA A polymeric blend comprising 11 wt % PBSA and 89 wt % PLA (on average, in the case of PB2.3) was prepared in three different physical forms:
PB2.1 a pellet with a thickness of around 3 mm;
PB2.2 a monofilament with a thickness of around 25 µm; and
PB2.3 a multicomponent fibre with a core-sheath configuration, the core comprising 70 wt % of the fibre and comprising PB1 (7:93 PBSA:PLA by weight), and the sheath comprising 30 wt % of the fibre and comprising PB4 (1:4 PBSA:PLA by weight).

Example 1.2: Formation of a Polymeric Blend Comprising PBSA and a PLA

A polymeric blend, PB3.1, comprising 15 wt % PBSA and 85 wt % PLA was prepared using the method described in Example 1. However, a different grade of PLA was used in this case: NatureWorks Ingeo™ Biopolymer 6752D. This grade has a lower crystallinity than the PLA grade used in Example 1 (NatureWorks Ingeo™ Biopolymer 6100D). The overall polymeric blend is therefore less crystalline than PB3, which also comprises 15 wt % PBSA and 85 wt % (more crystalline) PLA.

Example 2: Formation of Mixed Materials Comprising PBSA, PLA, PBAT, talc and SMS A series of polymeric blends comprising different weight percentages (given below) of PBSA (MCPP-PTT Bio-PBS™ FD92PM), PLA (NatureWorks Ingeo™ Biopolymer 6100D, D-isomer content 0.5%), PBAT (ecoflex® F Blend C1200), talc (Magsil 2628C) and sorbitan monostearate (SMS, Atmer™ 103) were mixed in a Thermo Scientific™ TSE 24 MC Twin-screw Extruder.

The PBSA and PLA were pre-dried and fed into the compounder using gravimetric feeders. The throughput was kept constant. The compounder was set to a temperature profile ranging from 140 to 200° C. and configured to provide intimate mixing. The screw speed was set to 500 rpm.

Although the mixed materials were intimately mixed in this example, this is not an essential feature of this process and the mixed materials may be otherwise mixed (e.g. by using a lower screw speed).

|           | Sample ID |     |     |     |     |     |
|-----------|-----|-----|-----|-----|-----|-----|
| Component | MM1 | MM2 | MM3 | MM4 | MM5 | MM6 |
| PLA wt %  | 12  | 20  | 28  | 36  | 44  | 39  |
| PBSA wt % | 3   | 5   | 7   | 9   | 11  | 10  |
| PBAT wt % | 59  | 49  | 39  | 29  | 19  | 42  |
| Talc wt % | 25  | 25  | 25  | 25  | 25  | 8   |
| SMS wt %  | 1   | 1   | 1   | 1   | 1   | 1   |

Example 3: Determination of the Home Compostability of Polymeric Blends and Mixed Materials—Biodegradation Testing Tests for home compostability were carried out according to the methods set out in ISO 14855-1:2012(E) at 28° C. The results of these tests are given in Tables 1 and 1.1 below.

The controlled composting biodegradation test is an optimized simulation of an intensive aerobic composting process where biodegradability of a test material (e.g. the polymeric blend described herein) under dry, aerobic conditions is determined. The maximum test period is 1 year.

The inoculum is derived from the organic fraction of municipal solid waste, which is stabilized and matured in a composting bin at the laboratory. Before use, the mature compost is sieved through a 5 mm sieve and the fine fraction is used as the inoculum, rich in bacteria and fungi. Total solids content of the compost inoculum is 50-55 wt %, while volatile solids concentration >30 wt % of dry solids. Each reactor contains a certain amount of inoculum; reference and test materials are added. Typically, 80 g of test material is added to 1200 g of inoculum. The test material used was in the form of powder, so no disintegration was to be observed during the test. A control containing inoculum only is prepared in the same way as is done for the test materials. The reactors are closed airtight and incubated at 28° C.+/−2° C. The flow rate of pressurized dry air is controlled by a gas flow controller and directed into the composting vessel at the bottom through a porous plate. The cumulative amount of $CO_2$ produced during the test as well as $O_2$ are analysed continuously as part of the gas leaving each individual reactor using a gas chromatograph, while the flow rate is measured with a mass flow meter. When the microbial activity is reduced, the test is converted to static conditions in which the oxygen in the headspace is consumed by the microorganisms. The evolved $CO_2$ is absorbed and determined by titration. A biodegradation of at least 90%* in total or 90% of the maximum degradation of the reference material (e.g. an equivalent weight of fully compostable material to the test material, such as a cellulose powder) should be achieved within a maximum period of 1 year.

* The percentage biodegradation ($D_t$) may be calculated as follows:

$$D_t = \frac{(CO_2)_T - (CO_2)_B}{ThCO_2} \times 100\%$$

where:

$(CO_2)_T$ is the cumulative amount of $CO_2$ evolved in each reactor containing test material (in grams per vessel);

$(CO_2)_B$ is the mean cumulative amount of $CO_2$ evolved in the blank vessels material (reactor with inoculum, without testing material; in grams per vessel); and $ThCO_2$ is the theoretical amount of $CO_2$ which can be produced by the test material (in grams per vessel). This may be calculated based on the total amount of carbon (organic carbon) in the test material.

Due to the length of time required to carry out this test, it has not been run to completion for all the samples in this work. Where such samples are expected to pass the test (based on the results of similar samples), the label "expected pass" has been given.

It can be seen that biodegradation occurs more quickly in the core-sheath multicomponent fibre sample PB2.3 than the monofilament sample PB2.2. Without wishing to be bound by theory, this may be because the PBSA-rich sheath initially biodegrades quickly (since PBSA biodegrades faster than PLA) and this initial momentum continues in the less PBSA-rich core due to the large number of microbes that have built up.

It can also be seen that pellet sample PB2.1 biodegrades faster than the monofilament sample PB2.2, despite the larger surface area of the ground monofilament (pellet granules are roughly spherical with a diameter of around 0.8 mm; monofilament granules are roughly cylindrical with a length of around 0.8 mm and a diameter of around 25 µm). Without wishing to be bound by theory, this may be because the monofilament has a higher crystallinity resulting from being stretched during spinning, which slows down its biodegradation.

Furthermore, it can be seen that the less crystalline sample PB3.1 biodegrades faster than its more crystalline analogue PB3. It is believed that a higher crystallinity slows down biodegradation.

Example 3.1: Determination of the Home Compostability of Polymeric Blends and Mixed Materials—Disintegration Testing A sample of polymeric blend PB4 was stretched into a 30 µm-thick film. The film was produced by blown film extrusion, a technique widely known in the art.

A multicomponent, core-sheath polymeric blend, PB7, was prepared, the core comprising 80 wt % of the fibre and comprising 11:89 PBSA:PLA by weight, and the sheath comprising 20 wt % of the fibre and comprising PB3.1 (15:85 PBSA:PLA by weight, with the less-crystalline 6752D PLA grade). This polymeric blend was stretched into a 138 g·m$^{-2}$ film using the method described above.

A mixed material, MM7, comprising 3 wt % PBSA (MCPP-PTT Bio-PBS™ FD92PM), 12 wt % PLA (NatureWorks Ingeo™ Biopolymer 6100D) and 85 wt % BP300 (a blend of home compostable polyester with starch) was formed using the method described in Example 2. This mixed material was stretched into a 40 μm-thick film using the method described above.

The visible disintegration of these films was evaluated over a number of weeks. The results of this test are shown in Figure A. These show that at the time of recording, PB4 and MM7 have passed the disintegration test since it has fully disintegrated. The test for PB7 is still ongoing.

Example 4: Determination of the Soil Biodegradability of Polymeric Blends and Mixed Materials Tests for soil biodegradability were carried out according to the methods set out in ISO 17556:2019(E). The results of these tests are given in Table 1 below.

The biodegradation may be evaluated according to ISO 17556:2019 (E) using standard soil. Maximum testing period is 2 years. The standard soil comprises a mixture of 70 wt % industrial quartz sand, 10 wt % kaolinite clay, 16 wt % natural soil, and 4 wt % mature compost (based on the total soil content). The natural soil is collected from at least 3 locations and is sieved over a 2 mm sieve to remove stones and other inert materials, roots, and other plant debris and thoroughly mixed. The mature compost is derived from the organic fraction of municipal solid waste. Before use, the compost is sieved through a 5 mm sieve. Finally, salts are added to the standard soil by means of nutrients solution ($KH_2PO_4$, $MgSO_4$, $NaNO_3$, urea, $NH_4Cl$) to obtain the final inoculum. At start-up, 2.0 g of reference or test material (e.g. the polymeric blend described herein) is mixed with 500 g of soil inoculum, while the control reactors contain only 500 g of soil inoculum. The reactors are closed airtight and placed in the dark at 25° C. +/−2° C. The evolved $CO_2$ is captured with a KOH solution and determined by titration. The OK biodegradable SOIL conformity mark stipulates that a biodegradation of at least 90%* in total or 90% of the maximum degradation of the reference material should be achieved within a maximum period of 2 years.

* The percentage biodegradation $D_t$ may be calculated as described in Example 3.

Due to the length of time required to carry out this test, it has not been run to completion for all the samples in this work. Where such samples are expected to pass the test (based on the results of similar samples), the label "expected pass" has been given.

Example 5: Determination of Tensile Properties of Polymers, Polymeric Blends and Mixed Materials Several tensile properties of various polymers, polymeric blends and mixed materials were measured using the methods set out in ISO 527-1:2019. The results are shown in Table 2 below.

A Zwick Roel Z005 universal testing machine was used to carry out the tests. All the test samples were bars type 1A. All the bars were produced by injection moulding using a BOY 22M injection moulding machine with a single cavity mould.

Example 6: Determination of Flexural Properties of Polymeric Blends and Mixed Materials Several flexural properties of various polymers, polymeric blends and mixed materials were measured using the methods set out in ISO 178:2019. The results are shown in Table 3 below.

A Zwick Roel Z005 universal testing machine was used to carry out the tests. All the test samples were bars type 1A. All the bars were produced by injection moulding using a BOY 22M injection moulding machine with a single cavity mould.

FIG. 3 shows the effect of increasing the weight percentage (based on the total weight of the mixed material) of a PBSA/PLA polymeric blend in a mixed material on the flexural modulus of the mixed material. The mixed material compositions can be found in Table 3.

Example 6.1: Determination of Flexural Properties of Mixed Material Films

A set of mixed materials comprising BP300 (a blend of home compostable polyester with starch) and varying amounts of PB4 (1:4 PBSA:PLA by weight) were prepared. These were made into films using the method given in Example 3.1.

The Young's moduli of these films were measured in two different directions: machine direction (MD, the direction of the stretch created by the pinch rolls) and transverse direction (TD, the direction of the stretch created by making the bubble wider or narrower, also known as cross direction/ CD).

The results of these tests are given in the table below and in FIG. 3.1.

| Sample composition | Direction of measurement | Thickness/mm | Young's modulus/MPa |
|---|---|---|---|
| BP300 | MD | 0.0252 | 142 |
|  | TD | 0.0306 | 140 |
| 90 wt % BP300; 10 wt % PB4 | MD | 0.029 | 253 |
|  | TD | 0.0302 | 163 |
| 85 wt % BP300; 15 wt % PB4 | MD | 0.0324 | 291 |
|  | TD | 0.0322 | 187 |
| 80 wt % BP300; 20 wt % PB4 | MD | 0.0334 | 305 |
|  | TD | 0.033 | 292 |

Example 7: Thermal Analysis of Polymeric Blends and Mixed Materials

The melt flow index (MFI) for various polymers, polymeric blends and mixed materials was measured using the method set out in ISO 1133-1:2011. All tests were carried out using a Davenport MFI10 testing machine, at 190° C. and using a load of 2.16 kg. All sample pellets were pre-dried before testing. It was found that as the weight percentage of secondary polymer (e.g. PBSA) increased, the swelling increased. This is typical of immiscible polymer blends. The results of these measurements are shown in Table 4 below.

The heat deflection temperature (HDT) in each case was also measured using the method set out in ISO 75-1:2020 (specifically the B-50 method). A Ray-Ran RR/HDVR HDT/vicat testing machine was used. The outer fibre stress used for testing was 0.45 MPa, and the temperature was increased at a ramp rate of 50° C.·h$^{-1}$. All the test samples were cut from test bars type 1A. All the bars were produced by injection moulding using a BOY 22M injection moulding machine with a single cavity mould. The results of these measurements are shown in Table 4 below. It was noted that all the samples showed similar HDT values.

Differential scanning calorimetry (DSC) curves for two polymeric blends comprising different ratios of PLA and PBSA were also obtained. Said DSC curves are shown in FIG. 1 and FIG. 2. The following characteristic temperatures can be inferred from these curves:

|  | Sample ID | |
| --- | --- | --- |
|  | PB4 | PB1 |
| Component | | |
| PLA wt % | 80 | 93 |
| PBSA wt % | 20 | 7 |
| Characteristic temperature | | |
| Glass transition temperature/° C. | 62.1 | 63.6 |
| Crystallisation temperature/° C. | 94.4 | 95.1 |
| Melting temperature/° C. | 176.5 | 179.1 |

The crystallinity of polymeric blends was also determined using DSC. Here, the melting enthalpy of the polymeric material is calculated from the area under the melting transition peak on the DSC spectrum. The cold crystallisation enthalpy of the polymeric material is similarly calculated from the area under the crystallisation peak on the DSC spectrum. The crystallinity is then calculated by comparing the difference between the melting enthalpy and the cold crystallisation enthalpy of the polymeric material with the melting enthalpy of a fully crystalline sample of the polymeric material. The crystallinity of a series of polymeric blends comprising PBSA (MCPP-PTT Bio-PBS™ FD92PM) and PLA (NatureWorks Ingeo™ Biopolymer 6100D, D-isomer content 0.5%) is given in the table below:

|  | Sample ID | | | | | | |
| --- | --- | --- | --- | --- | --- | --- | --- |
| Component | PB2 | PB2.4 | PB3 | PB3.2 | PB4 | PB5 | PB6 |
| PBSA wt % | 10 | 13 | 15 | 17 | 20 | 30 | 40 |
| PLA wt % | 90 | 87 | 85 | 83 | 80 | 70 | 60 |
| Crystallinity/% | 20.8 | 23 | 24 | 24.8 | 27.3 | 34.4 | 37.8 |

The following parameters were used in the DSC experiments:

|  | Initial temperature/° C. | Target temperature/° C. | Temperature gradient/° C. min$^{-1}$ |
| --- | --- | --- | --- |
| Dynamic | 20 | 230 | 10 |
| Dynamic | 230 | −20 | −10 |
| Static | 10 min at −20° C. | | |
| Dynamic | −20 | 230 | 10 |
| Dynamic | 230 | 20 | −10 |
| N$_2$ flow | 20 ml min$^{-1}$ during all test | | |

Example 8: Rheological Studies on Polymeric Blends Comprising PBSA and PLA

A series of polymeric blends comprising different weight percentages (given below) of PBSA (MCPP-PTT Bio-PBS™ FD92PM) and PLA (NatureWorks Ingeo™ Biopolymer 6100D, D-isomer content 0.5%) were formed according to the method in Example 1.

|  | Sample ID | | | | | | |
| --- | --- | --- | --- | --- | --- | --- | --- |
| Component | PB2 | PB2.4 | PB3 | PB3.2 | PB4 | PB5 | PB6 |
| PLA wt % | 90 | 87 | 85 | 83 | 80 | 70 | 60 |
| PBSA wt % | 10 | 13 | 15 | 17 | 20 | 30 | 40 |

Rheological studies were performed on these blends using a method based on that given in ISO 11443:2021. The extensional viscosity of each of the blends was measured using a Rosand RH10 capillary rheometer, set up in twin bore mode with 8×0.5 mm long and 0×0.5 mm orifice capillary dies. Evaluation was performed at 230° C. with wall shear rates ranging from 100 to 10 000 s$^{-1}$.

The results are shown in FIG. 4, and observations on the filaments obtained during the rheological studies are given below.

Observations

PB2: test ran well, produced fine filament.

PB2.4: test ran well, the filament was stable and no die swelling was observed.

PB3: test ran well, produced fine filament.

PB2.4: test ran well, the filament was stable and no die swelling was observed.

PB4: extruded filament showed more die swelling than PB3 and PB2 (extruded filament was slightly thicker than PB3 and PB2)

PB5: filament showed significantly more die swelling than previous filaments (much thicker extruded filament), significant flow instabilities detected in die pressure and filament surface, highly elastic polymer PB6: filament showed high die swelling (much thicker extruded filament), significant flow instabilities detected in die pressure and filament surface, highly elastic polymer Example 9: Effects of Mixing Intimacy on a Polymeric Blend Comprising PBSA and PLA A series of polymeric blends comprising 20 wt % of PBSA (MCPP-PTT Bio-PBS™ FD92PM) and 80 wt % of PLA (NatureWorks Ingeo™M Biopolymer 6100D, D-isomer content 0.5%) were mixed in a Thermo-Fisher MSE Prism 24 mm twin screw compounder. The compounder was set to a temperature profile ranging from 140 to 200° C.

The screw speed was varied between the samples. Furthermore, for the samples that were mixed with a screw speed of 225 rpm, high shear screws were used in one sample and low shear screws were used in another sample. Various parameters from the compounding process for each sample are given in Table 5 below. The effects of the screw speed/shear on the energy applied to the material during compounding are shown in FIG. 5.

Scanning electron microscopy (SEM) images of selected samples were obtained. A JEOL 7100F scanning electron microscope was used, using an accelerating voltage of 5 KV and a working distance of 10.0 mm. Freeze fractured sample pieces were attached to an SEM stub using sticky carbon tabs. Sample stubs were then sputter coated with around 8 nm iridium. Samples were then transferred to the SEM for HV imaging. Multiple fracture faces per sample group were imaged to assess uniformity.

FIG. 6 shows scanning electron micrographs of the PB4 resin compounded under progressively increasing shear conditions. Magnification is ×5000, and a 1 micron scale bar is shown at the bottom of each image. FIG. 6a shows the morphology using a lower-shear screw design at low rotational speed. FIG. 6b to FIG. 6d depict the blend morphologies using a higher-shear screw design at a range of increasing rotational speeds. These compounding conditions reflect increasing mechanical shear energy imparted in mixing, as measured by the specific mechanical energies in Table 5.

The PBSA polymer can clearly be seen as smaller "islands", regular in outline, in a "sea" of surrounding PLA polymer. As the specific mechanical energy increases it is clear that the dispersion of the PBSA in the majority PLA polymer improves—larger islands are less evident. Indeed, under the strongest conditions, FIG. 6d, relatively few islands are evident, indicative of good mixing of the two polymers.

* * *

The disclosure also comprises the following clauses, which may be claimed:

1. Use of poly(butylene succinate co-adipate) (PBSA), mixed with a further substance comprising one or more polymers to form a polymeric blend, to improve the home compostability and/or soil biodegradability of the further substance comprising one or more polymers.
2. The use of clause 1, wherein the polymeric blend is or has been intimately mixed.
3. A method of improving the home compostability and/or soil biodegradability of a substance comprising one or more polymers, the method comprising mixing the substance comprising one or more polymers with poly(butylene succinate co-adipate) (PBSA) to form a polymeric blend.
4. The method of clause 3, wherein mixing comprises intimately mixing.
5. The use or method according to any preceding clause, wherein the further substance comprising one or more polymers comprises a polyester (optionally a biodegradable and/or compostable polyester) such that the polymeric blend comprises said PBSA and polyester, optionally wherein the polymeric blend consists essentially of said PBSA and polyester; optionally wherein said polyester is poly(lactic acid) (PLA) and/or poly(caprolactone) (PCL), optionally poly(lactic acid) (PLA) and poly(caprolactone) (PCL).
6. The method or use according to any preceding clause, wherein the PBSA is or has been mixed with the further substance comprising one or more polymers at high specific mechanical energy (e.g. high shear), optionally wherein the method comprises mixing PBSA with the further substance comprising one or more polymers at high specific mechanical energy (e.g. high shear).
7. The method or use according to any preceding clause, wherein, in the use, the polymeric blend is or has been mixed with a material to form a mixed material.
8. The method or use according to any preceding clause, wherein, in the method, the polymeric blend is or has been mixed with a material to form a mixed material.
9. Use of a polymeric blend comprising poly(butylene succinate co-adipate) (PBSA) and a polyester (optionally a biodegradable and/or compostable polyester, such as PLA) as a stiffening agent for a material, wherein the polymeric blend and material collectively form a mixed material.
10. The use of clause 9, wherein the mixed material is or has been intimately mixed.
11. A method of stiffening a material, wherein the material is or has been mixed with a polymeric blend comprising poly(butylene succinate co-adipate) (PBSA) and a polyester (optionally a biodegradable and/or compostable polyester, such as PLA) to form a mixed material, wherein the mixed material has a higher stiffness than the material.
12. The method of clause 11, wherein the mixed material is or has been intimately mixed.
13. The use or method according to any one of clauses 9 to 12, wherein the polymeric blend is home compostable and/or soil biodegradable, optionally wherein the mixed material is home compostable and/or soil biodegradable.
14. The use or method according to any one of clauses 7 to 13, wherein the mixed material comprises said PBSA and, when present, said polyester (optionally a biodegradable and/or compostable polyester, such as PLA); and further comprises poly(butylene adipate-co-terephthalate) (PBAT); optionally wherein the mixed material consists essentially of said PBSA, polyester when present and PBAT.
15. The use or method according to any one of clauses 7 to 14, wherein the mixed material comprises at least around 1 wt % PBAT, optionally at least around 5 wt % PBAT, optionally at least around 10 wt % PBAT, optionally at least around 15 wt % PBAT, optionally at least around 20 wt %, optionally at least around 25 wt %, optionally at least around 30 wt %, optionally at least around 35 wt %, optionally at least around 40 wt %, optionally at least around 45 wt %, optionally at least around 50 wt %, optionally at least around 55 wt %, optionally at least around 60 wt %, optionally at least around 65 wt %, optionally at least around 70 wt %, optionally at least around 75 wt %, optionally around 75 wt %, based on the total weight of the mixed material.
16. The use or method according to any one of clauses 7 to 15, wherein the mixed material comprises at most around 80 wt % PBAT, optionally at most around 75 wt %, optionally at most around 70 wt %, optionally at most around 65 wt %, optionally at most around 60 wt %, optionally at most around 55 wt %, optionally at most around 50 wt %, optionally at most around 45 wt %, optionally at most around 40 wt %, optionally at most around 35 wt %, optionally at most around 30 wt %, optionally at most around 25 wt %, based on the total weight of the mixed material.
17. The use or method according to any one of clauses 7 to 16, wherein the mixed material comprises around 1 to 80 wt % PBAT, optionally around 5 to 80 wt % PBAT, optionally around 10 to 80 wt % PBAT, optionally around 15 to 80 wt % PBAT, optionally around 20 to 60 wt %, optionally around 25 to 50 wt %, based on the total weight of the mixed material.
18. The use or method according to any one of clauses 7 to 17, wherein the mixed material comprises at least around 7.5 wt % polyester (optionally a biodegradable and/or compostable polyester, such as PLA), optionally at least around 10 wt %, optionally at least around 12.5 wt %, optionally at least around 20 wt %, optionally at least around 25 wt %, optionally at least around 30 wt %, optionally at least around 35 wt %, optionally at least around 40 wt %, based on the total weight of the mixed material.
19. The use or method according to any one of clauses 7 to 18, wherein the mixed material comprises at most around 50 wt % polyester (optionally a biodegradable and/or compostable polyester, such as PLA), optionally at most around 45 wt %, optionally at most around 40 wt %, optionally at most around 35 wt %, optionally at most around 30 wt %, optionally at most around 25 wt %, optionally at most around 20 wt %, optionally at most around 15 wt %, based on the total weight of the mixed material.

20. The use or method according to any one of clauses 7 to 19, wherein the mixed material comprises around 7.5 to 50 wt % polyester (optionally a biodegradable and/or compostable polyester, such as PLA), optionally around 15 to 45 wt %, optionally around 20 to 40 wt %, optionally around 20 to 30 wt %, based on the total weight of the mixed material.

21. The use or method according to any one of clauses 7 to 20, wherein the mixed material comprises at least around 0.4:1 PBAT to polyester (optionally a biodegradable and/or compostable polyester, such as PLA), optionally at least around 0.75:1, optionally at least around 1:1, optionally at least around 1.25:1, optionally at least around 2:1, optionally at least around 2.5:1, optionally at least around 4:1, optionally at least around 5:1, based on the weights of said PBAT and polyester (e.g. PLA).

22. The use or method according to any one of clauses 7 to 21, wherein the mixed material comprises at most around 5:1 PBAT to polyester (optionally a biodegradable and/or compostable polyester, such as PLA), optionally at most around 4:1, optionally at most around 2.5:1, optionally at most around 2:1, optionally at most around 1.25:1, optionally at most around 1:1, optionally at most around 0.75:1, based on the weights of said PBAT and polyester (e.g. PLA).

23. The use or method according to any one of clauses 7 to 22, wherein the mixed material comprises around 0.4:1 to 5:1 PBAT to polyester (optionally a biodegradable and/or compostable polyester, such as PLA), optionally around 1:1 to 5:1, optionally around 2:1 to 5:1, optionally around 2.5:1 to 5:1, based on the weights of said PBAT and polyester (e.g. PLA).

24. The use or method according to any one of clauses 7 to 23, wherein the mixed material comprises at least around 5 wt % of the polymeric blend, optionally at least around 10 wt %, optionally at least around 15 wt %, optionally at least around 25 wt %, optionally at least around 35 wt %, based on the total weight of the mixed material.

25. The use or method according to any one of clauses 7 to 24, wherein the mixed material comprises at most around 99 wt % of the polymeric blend, optionally at most around 95 wt %, optionally at most around 80 wt %, optionally at most around 70 wt %, optionally at most 65 wt %, optionally at most around 60 wt %, optionally at most around 55 wt %, based on the total weight of the mixed material.

26. The use or method according to any one of clauses 7 to 25, wherein the mixed material comprises around 5 to 99 wt % of the polymeric blend, optionally around 5 to 95 wt %, optionally around 5 to 80 wt %, optionally around 10 to 70 wt %, optionally around 15 to 65 wt %, optionally around 20 to 55 wt %, based on the total weight of the mixed material.

27 The use or method according to any one of clauses 7 to 26, wherein the mixed material comprises at least around 5 wt % of one or more further ingredients, optionally at least around 10 wt %, optionally at least around 15 wt %, optionally at least around 20 wt %, optionally at least around 25 wt %, based on the total weight of the mixed material.

28. The use or method according to any one of clauses 7 to 27, wherein the mixed material comprises at most around 30 wt % of one or more further ingredients, optionally at most around 25 wt %, optionally at most 20 wt %, optionally at most around 15 wt %, optionally at most around 10 wt %, based on the total weight of the mixed material.

29. The use or method according to any one of clauses 7 to 28, wherein the mixed material comprises around 5 to 30 wt % of one or more further ingredients, optionally around 15 to 30 wt %, optionally around 20 to 30 wt %, optionally around 25 wt %, based on the total weight of the mixed material.

30. The use or method according to any one of clauses 27 to 29, wherein the one or more further ingredients in the mixed material comprises a filler, optionally wherein:
(a) the filler is an inorganic filler, optionally wherein the inorganic filler is a metal hydroxide or carbonate (optionally hydroxide), optionally magnesium hydroxide or calcium carbonate, optionally wherein the inorganic filler is silica, talc, wollastonite or a nanofiller; or
(b) the filler is an organic filler, optionally wherein the organic filler is a flour, a native starch, a cellulosic powder or a nanofiller.

31. The use or method of clause 30, wherein the filler is present in the mixed material at around 1 to 50 wt % (e.g. around 5 to 10 wt %, optionally around 6 to 9 wt %, optionally around 8 wt %), optionally around 10 to 40 wt % (e.g. around 15 to 35 wt %, optionally around 20 to 30 wt %, optionally around 25 wt %), optionally around 20 to 30 wt %, based on the total weight of the mixed material.

32. The use or method according to any one of clauses 27 to 31, wherein the one or more further ingredients in the mixed material comprises a lubricant, optionally wherein the lubricant is:
(a) an amphiphile, optionally wherein the lubricant is a non-ionic amphiphile, optionally wherein the lubricant is a stearate, such as a sorbitan ester or glycerol monostearate, optionally wherein the sorbitan ester is sorbitan monostearate; and/or
(b) selected from fatty acids, fatty acid esters, fatty acid amides, polyolefin wax derivatives and natural waxes.

33. The use or method of clause 32, wherein the lubricant is present in the mixed material at around 0.1 to 3 wt %, optionally around 0.25 to 2 wt %, and optionally around 0.5 to 1.5 wt %, optionally around 0.75 to 1.25 wt %, optionally around 0.85 to 1.15 wt %, optionally around 1 wt %, based on the total weight of the mixed material.

34. The use or method according to any one of clauses 27 to 33, wherein the one or more further ingredients in the mixed material comprises a reinforcing additive, optionally wherein the reinforcing additive is a fibrous reinforcing additive, optionally wherein the fibrous reinforcing additive is:
(a) an inorganic fibrous reinforcing additive; optionally hemp, flax or cellulose; or
(b) an organic fibrous reinforcing additive; optionally glass or carbon.

35. The use or method of clause 34, wherein the reinforcing additive is present in the mixed material at around 1 to 50 wt %, optionally around 10 to 40 wt %, and optionally around 20 to 30 wt %, based on the total weight of the mixed material.

36. The use or method of any one of clauses 27 to 35, wherein the one or more further ingredients in the mixed material comprises a compatibilising agent, optionally wherein the compatibilising agent is:
(a) an amphiphile, optionally a fatty acid, a fatty acid ester, a phospholipid, a copolymer with varying hydrophobicity regions or a plasticiser with varying hydrophobicity regions; or
(b) a cross-linking agent, optionally a hydrogen bond forming agent (such as a dicarboxylic acid or a dialcohol) or a covalent bond-forming agent (such as a maleated copolymer, a peroxide or an isocyanate); or
(c) an aliphatic polyester.

37. The use or method of clause 36, wherein the compatibilising agent is present in the mixed material at around 1 to 5 wt %, optionally around 1 to 4 wt %, and optionally around 2 to 3 wt %, based on the total weight of the mixed material.

38. The use or method according to any one of clauses 7 to 37, wherein the mixed material has a flexural modulus at least around 50% higher than that of the material, optionally at least around 100% higher, optionally at least around 500% higher, optionally at least around 1000% higher, optionally at least around 2000% higher.

39. The use or method of any one of clauses 7 to 38, wherein the mixed material has a flexural modulus of at least around 350 MPa, optionally at least around 500 MPa, optionally at least around 600 MPa, optionally at least around 700 MPa, optionally at least around 1000 MPa.

40. The use or method of any one of clauses 7 to 39, wherein the mixed material has a flexural modulus of at most around 9000 MPa, optionally at most around 7000 MPa, optionally at most around 6000 MPa, optionally at most around 5000 MPa, optionally at most around 4000 MPa, optionally at most around 3000 MPa.

41. The use or method of any one of clauses 7 to 40, wherein the mixed material has a flexural modulus of around 350 to 9000 MPa, optionally around 500 to 7000 MPa, optionally around 600 to 6000 MPa, optionally 700 to 5000 MPa, optionally around 1000 to 3000 MPa.

42. The method or use according to any preceding clause, wherein the PBSA and further substance comprising one or more polymers are or have been mixed at: a specific mechanical energy of at least around 0.10 kW·h·kg$^{-1}$, optionally at least around 0.20 kW·h·kg$^{-1}$, optionally at least around 0.25 kW·h·kg$^{-1}$, optionally at least around 0.28 kW·h·kg$^{-1}$, optionally at least around 0.30 kW·h·kg$^{-1}$.

43. The method or use according to any preceding clause, wherein the PBSA and further substance comprising one or more polymers are or have been mixed at: a specific mechanical energy of at most around 1.00 kW·h·kg$^{-1}$.

44. The method or use according to any preceding clause, wherein the PBSA and further substance comprising one or more polymers are or have been mixed at: a specific mechanical energy of around 0.10 to 1.00 kW·h·kg$^{-1}$, optionally around 0.20 to 1.00 kW·h·kg$^{-1}$, optionally around 0.25 to 1.00 kW·h·kg$^{-1}$, optionally around 0.28 to 1.00 kW·h·kg$^{-1}$, optionally around 0.30 to 1.00 kW·h·kg$^{-1}$.

45. The method or use according to any preceding clause, wherein the PBSA and further substance comprising one or more polymers are or have been mixed with: a screw mixer rotating at a screw speed of at least around 225 rpm, optionally at least around 300 rpm, optionally at least around 350 rpm.

46. The method or use according to any preceding clause, wherein the PBSA and further substance comprising one or more polymers are or have been mixed with: a screw mixer rotating at a screw speed of at most around 1000 rpm.

47. The method or use according to any preceding clause, wherein the PBSA and further substance comprising one or more polymers are or have been mixed with: a screw mixer rotating at a screw speed of around 225 to 1000 rpm, optionally around 300 to 1000 rpm, optionally around 350 to 1000 rpm.

48. The method or use according to any preceding clause, wherein the PBSA and further substance comprising one or more polymers are or have been mixed at: a torque of at least around 40%, optionally at least around 45%, optionally at least around 50%.

49. The method or use according to any preceding clause, wherein the PBSA and further substance comprising one or more polymers are or have been mixed at: a torque of at most around 80%, optionally at most around 75%, optionally at most around 70%.

50. The method or use according to any preceding clause, wherein the PBSA and further substance comprising one or more polymers are or have been mixed at: a torque of around 40 to 80%, optionally around 45 to 75%, optionally around 50 to 70%.

51. The use or method according to any preceding clause, wherein the polymeric blend comprises at least around 1 wt % PBSA, optionally at least around 2 wt %, optionally at least around 5 wt %, optionally at least around 10 wt %, optionally at least around 20 wt %, optionally at least around 30 wt %, optionally at least around 40 wt %, based on the total polymeric content in the polymeric blend.

52. The use or method according to any preceding clause, wherein the polymeric blend comprises at most around 75 wt % PBSA, optionally at most around 65 wt %, optionally at most around 50 wt %, optionally at most around 40 wt %, optionally at most around 30 wt %, optionally at most around 20 wt %, optionally at most around 15 wt %, optionally at most around 7 wt % (e.g. around 7 wt %), optionally at most around 5 wt %, based on the total polymeric content in the polymeric blend.

53. The use or method according to any preceding clause, wherein the polymeric blend comprises around 1 to 75 wt % PBSA, optionally around 2 to 65 wt % (e.g. around 2 to 10 wt %), optionally around 5 to 50 wt %, optionally around 10 to 40 wt %, based on the total polymeric content in the polymeric blend.

54. The use or method according to any preceding clause, wherein the polymeric blend comprises at least around 60 wt % further substance comprising one or more polymers, optionally at least around 70 wt %, optionally at least around 80 wt %, optionally at least around 90 wt %, optionally at least around 93 wt %, optionally around 93 wt %, based on the total polymeric content in the polymeric blend; optionally wherein said further substance comprising one or more polymers is polyester (optionally a biodegradable and/or compostable polyester, such as PLA).

55. The use or method according to any preceding clause, wherein the polymeric blend comprises at most around 99 wt % further substance comprising one or more polymers, optionally at most around 98 wt %, optionally at most around 95 wt %, optionally at most around 90 wt %, optionally at most around 80 wt %, optionally at most around 70 wt %, based on the total polymeric content in the polymeric blend; optionally wherein said further substance comprising one or more polymers is polyester (optionally a biodegradable and/or compostable polyester, such as PLA).

56. The use or method according to any preceding clause, wherein the polymeric blend comprises around 60 to 99 wt % further substance comprising one or more polymers, optionally around 70 to 98 wt %, optionally around 80 to 95 wt %, optionally around 90 to 93 wt %, based on the total polymeric content in the polymeric blend; optionally wherein said further substance comprising one or more polymers is polyester (optionally a biodegradable and/or compostable polyester, such as PLA).

57. The use or method according to any preceding clause, wherein the polymeric blend comprises:

around 1 to 40 wt % PBSA, optionally around 2 to 35 wt % (e.g. around 2 to 10 wt %), optionally around 5 to 30 wt %, optionally around 10 to 25 wt %, based on the total polymeric content in the polymeric blend; and around 60 to 99 wt % further substance comprising one or more polymers, optionally around 65 to 98 wt %, optionally around 70 to 95 wt %, optionally around 75 to 90 wt %, based on the total polymeric content in the polymeric blend; optionally wherein said further substance comprising one or more polymers is polyester (optionally a biodegradable and/or compostable polyester, such as PLA).

58. The use or method according to any preceding clause, wherein the polymeric blend comprises at least around 1:99 PBSA to further substance comprising one or more polymers, optionally at least around 5:95, optionally at least around 7:93 (e.g. around 7:93), based on the weights of PBSA and further substance comprising one or more polymers and wherein the sum of integers in the ratio is 100; optionally wherein said further substance comprising one or more polymers is polyester (optionally a biodegradable and/or compostable polyester, such as PLA).

59 The use or method according to any preceding clause, wherein the polymeric blend comprises at most around 10:90 PBSA to further substance comprising one or more polymers, optionally at most around 7:93, optionally at most around 5:96, optionally around 1:99, based on the weights of PBSA and further substance comprising one or more polymers and wherein the sum of integers in the ratio is 100; optionally wherein said further substance comprising one or more polymers is polyester (optionally a biodegradable and/or compostable polyester, such as PLA).

60. The use or method according to any preceding clause, wherein the polymeric blend comprises around 1:99 to 10:90 PBSA to further substance comprising one or more polymers, optionally around 5:95 to 10:90, optionally around 5:95 to 7:93, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

61. The use or method according to any preceding clause, wherein the polymeric blend comprises at least around 15:85 PBSA to further substance comprising one or more polymers, optionally at least around 20:80, optionally at least around 35:65, optionally at least around 40:60, optionally around 40:60, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

62. The use or method according to any preceding clause, wherein the polymeric blend comprises at most around 40:60 PBSA to further substance comprising one or more polymers, optionally at most around 35:65, optionally at most around 20:80, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

63. The use or method according to any preceding clause, wherein the polymeric blend comprises around 15:85 to 40:60 PBSA to further substance comprising one or more polymers, optionally around 20:80 to 40:60, based on the weights of said PBSA and further substance comprising one or more polymers and wherein the sum of integers in the ratio is 100; optionally wherein said further substance comprising one or more polymers is polyester (optionally a biodegradable and/or compostable polyester, such as PLA).

64. The use or method according to any preceding clause, wherein the polymeric blend comprises PLA having a D-isomer content of at least around 0.1 wt %, optionally at least around 0.25 wt %, and optionally at least around 0.5 wt %, based on the total PLA content (D to L) in the polymeric blend.

65. The use or method according to any preceding clause, wherein the polymeric blend comprises PLA having a D-isomer content of at most around 16 wt %, optionally at most around 10 wt %, optionally at most around 5 wt %, optionally around 1 wt %, based on the total PLA content (D to L) in the polymeric blend.

66. The use or method according to any preceding clause, wherein the polymeric blend comprises PLA having a D-isomer content of around 0.1 to 16 wt % (e.g. around 0.5 wt %), optionally around 0.25 to 10 wt %, optionally around 0.5 to 5 wt %, optionally around 0.5 to 1 wt %, based on the total PLA content (D to L) in the polymeric blend.

67. The use or method according to any preceding clause, wherein the polymeric blend is melt spinnable (e.g. in a monofilament or multi-filament process, optionally as described herein).

68. The use or method according to any preceding clause, wherein the polymeric blend has an extensional viscosity of at most around 5 kPa·s, optionally at most around 4 kPa·s, optionally at most around 3.5 kPa·s, optionally at most around 3 kPa·s.

69. The use or method according to any preceding clause, wherein the polymeric blend has an extensional viscosity of at least around 0.5 kPa·s, optionally at least around 0.75 kPa·s, optionally at least around 0.9 kPa·s, optionally at least around 1 kPa·s.

70. The use or method according to any preceding clause, wherein the polymeric blend has an extensional viscosity of around 0.5 to 5 kPa·s, optionally around 0.75 to 4 kPa·s, optionally around 0.9 to 3.5 kPa·s, optionally around 1 to 3 kPa·s.

71. The use or method according to any preceding clause, wherein at least around 80 to 100 wt % of said PBSA is unbranched, optionally around 85 to 95 wt %, optionally around 90 wt %.
72. The use or method according to any preceding clause, wherein at least around 80 to 100 wt % of said PBSA is not cross-linked, optionally around 85 to 95 wt %, optionally around 90 wt %.
73. A product comprising a polymeric blend comprising polyester (optionally a biodegradable and/or compostable polyester, such as PLA) and poly(butylene succinate co-adipate) (PBSA), wherein the polymeric blend is home compostable and/or soil biodegradable; and/or wherein the polymeric blend has a flexural modulus greater than around 2000 MPa (optionally wherein the polymeric blend is as defined in any one of clauses 1 to 72), optionally wherein the product comprises a mixed material as defined in any one of clauses 7 to 50.
74. The product of clause 73, wherein said polyester (optionally a biodegradable and/or compostable polyester, such as PLA) and PBSA are present in an amount according to any one of clauses 51 to 63.
75. The product according to any one of clauses 73 to 74, wherein said polymeric blend has a Young's modulus of at least around 500 MPa, optionally at least around 750 MPa, optionally at least around 1000 MPa, optionally at least around 1250 MPa.
76. The product according to any one of clauses 73 to 75, wherein said polymeric blend has a Young's modulus of at most around 1500 MPa, optionally at most around 1400 MPa, optionally at most around 1300 MPa, optionally at most around 1200 MPa, optionally at most around 1100 MPa, optionally at most around 1000 MPa.
77. The product according to any one of clauses 73 to 76, wherein said polymeric blend has a Young's modulus of around 500 to 1500 MPa, optionally around 750 to 1400 MPa, optionally around 1000 to 1400 MPa.
78. The product according to any one of clauses 73 to 77, wherein said polymeric blend has a flexural modulus of at least around 2250 MPa, optionally at least around 2500 MPa, optionally at least around 3000 MPa, optionally at least around 3500 MPa.
79. The product according to any one of clauses 73 to 78, wherein said polymeric blend has a flexural modulus of at most around 4000 MPa, optionally at most around 3750 MPa, optionally at most around 3500 MPa, optionally at most around 3000 MPa, optionally at most around 2500 MPa, optionally at most around 2000 MPa.
80. The product according to any one of clauses 73 to 79, wherein said polymeric blend has a flexural modulus of around 2250 to 4000 MPa, optionally around 2500 to 3750 MPa, optionally around 3000 to 3750 MPa.
81. The product according to any one of clauses 73 to 80, comprising a polymeric blend according to any preceding clause.
82. The product according to any one of clauses 73 to 81, wherein the polymeric blend is or has been mixed with one or more further ingredients to form a mixed material as defined in any one of clauses 7 to 50.
83. A product formable by the method according to any one of clauses 1 to 72, optionally wherein said product is formed by said method.
84. The product according to any one of clauses 73 to 83, wherein the polymeric blend is or has been mixed with one or more further ingredients to form a mixed material comprising:
around 10 to 60 wt % polymeric blend of PBSA and PLA,
around 10 to 60 wt % PBAT,
around 0.5 to 1.5 wt % lubricant, optionally around 0.8 to 1.2 wt %, optionally around 1 wt %, optionally wherein said lubricant is sorbitan monostearate,
wherein wt % is based on the total weight of the mixed material; and
wherein the polymeric blend comprises:
around 5:95 to 30:70 PBSA to PLA, based on the weights of PBSA and PLA in the polymeric blend.
85. The product according to any one of clauses 73 to 84, wherein the polymeric blend is or has been mixed with one or more further ingredients to form a mixed material comprising:
around 10 to 60 wt % polymeric blend of PBSA and PLA,
around 10 to 60 wt % PBAT,
around 20 to 30 wt % filler, optionally around 23 to 27 wt %, optionally around 25 wt %, optionally wherein said filler is talc,
around 0.5 to 1.5 wt % lubricant, optionally around 0.8 to 1.2 wt %, optionally around 1 wt %, optionally wherein said lubricant is sorbitan monostearate,
wherein wt % is based on the total weight of the mixed material; and
wherein the polymeric blend comprises:
around 5:95 to 30:70 PBSA to PLA, based on the weights of PBSA and PLA in the polymeric blend.
86. The product according to any one of clauses 73 to 85, wherein the polymeric blend is or has been mixed with one or more further ingredients to form a mixed material comprising:
around 20 to 50 wt % polymeric blend of PBSA and PLA,
around 20 to 50 wt % PBAT,
around 20 to 30 wt % filler, optionally around 23 to 27 wt %, optionally around 25 wt %, optionally wherein said filler is talc,
around 0.5 to 1.5 wt % lubricant, optionally around 0.8 to 1.2 wt %, optionally around 1 wt %, optionally wherein said lubricant is sorbitan monostearate,
wherein wt % is based on the total weight of the mixed material; and
wherein the polymeric blend comprises:
around 10:90 to 25:75 PBSA to PLA, based on the weights of PBSA and PLA in the polymeric blend.
87. The product according to clause 86, wherein the mixed material comprises: around 20:80 PBSA to PLA, based on the weights of PBSA and PLA in the mixed material.
88. The product according to clause 86, wherein the mixed material comprises:
around 80:20 PBAT to PLA, based on the weights of PBAT and PLA in the mixed material.
89. The product, use or method according to any preceding clause, wherein said polymeric blend is or has been mixed at a temperature of around 50 to 300° C., optionally around 75 to 250° C., optionally around 100 to 225° C., optionally around 140 to 200° C.
90. The product according to any one of clauses 73 to 89, wherein the product is a home compostable and/or soil biodegradable product selected from a spun fibre, a bag, a food or drink package, a food or drink utensil, a coffee brewing pod, a woven or non-woven material (optionally comprising spun fibres), a filter, a film (e.g.

an agricultural film, such as a mulch film) and a wrapping material (e.g. a food wrapping material or a plant wrapping material, such as a tree guard).

91. Use of poly(butylene succinate co-adipate) (PBSA), mixed with a further substance comprising one or more polymers to form a polymeric blend, to improve the home compostability and/or soil biodegradability of the further substance comprising one or more polymers;
wherein the PBSA is or has been provided as a masterbatch, wherein the masterbatch comprises PBSA diluted with a further substance comprising one or more polymers;
preferably wherein said PBSA is mixed by extrusion;
optionally wherein said use is as described in any one of clauses 1, 2, 5 to 10 and 13 to 72.

92. A method of improving the home compostability and/or soil biodegradability of a substance comprising one or more polymers, the method comprising mixing the substance comprising one or more polymers with poly(butylene succinate co-adipate) (PBSA) to form a polymeric blend;
wherein the PBSA is provided as a masterbatch prior to said mixing, wherein the masterbatch comprises PBSA diluted with a further substance comprising one or more polymers;
preferably wherein said mixing is by extrusion;
optionally wherein said method is as described in any one of clauses 3 to 8 and 11 to 72.

93. The use according to clause 91 or method according to clause 92, wherein the masterbatch comprises at least around 5 wt % PBSA, optionally at least around 10 wt %, optionally at least around 15 wt %, optionally at least around 20 wt %, optionally at least around 30 wt %, optionally at least around 40 wt %, optionally at least around 50 wt %, based on the total polymeric content in the masterbatch.

94. The use or method according to any one of clauses 91 to 93, wherein the masterbatch comprises at most around 75 wt % PBSA, optionally at most around 65 wt %, optionally at most around 50 wt %, optionally at most around 40 wt %, optionally at most around 35 wt %, optionally at most around 33 wt %, optionally at most around 30 wt %, based on the total polymeric content in the masterbatch.

95. The use or method according to any one of clauses 91 to 94, wherein the masterbatch comprises around 25 to 50 wt % PBSA, optionally around 28 to 40 wt %, optionally around 30 to 35 wt %, optionally around 33 wt %, based on the total polymeric content in the masterbatch.

96. A use, method or product substantially as defined herein with reference to the accompanying description and/or drawings.

Any listing or discussion of an apparently prior-published document in this specification should not necessarily be taken as an acknowledgement that the document is part of the state of the art or common general knowledge. All references disclosed herein are to be considered to be incorporated herein by reference.

All features discussed herein in respect of any of the uses, methods or products relate to all other uses, methods or products *mutatis mutandis*.

Those skilled in the art will recognise or be able to ascertain using no more than routine experimentation many equivalents to the specific embodiments described herein. The scope of the present disclosure herein is not intended to be limited to the above description, but rather is as set forth in the appended claims. Those of ordinary skill in the art will appreciate that various changes and modifications to this description may be made without departing from the spirit or scope of the present disclosure.

TABLE 1

Results and parameters for home compostability and soil biodegradability tests

| Component | Sample ID | | | | | | | | |
|---|---|---|---|---|---|---|---|---|---|
| | PB1 | PB2 | PB2.1 | PB3 | PB3.2 | PB4 | PB5 | PB6 | MM1 |
| PLA wt % | 93 | 90 | 87 | 85 | 83 | 80 | 70 | 60 | 12 |
| PBSA wt % | 7 | 10 | 13 | 15 | 17 | 20 | 30 | 40 | 3 |
| PBAT wt % | 0 | 0 | 0 | 0 | 0 | 0 | 0 | 0 | 59 |
| Talc wt % | 0 | 0 | 0 | 0 | 0 | 0 | 0 | 0 | 25 |
| SMS wt % | 0 | 0 | 0 | 0 | 0 | 0 | 0 | 0 | 1 |
| | Home compostability test result (after one year) | | | | | | | | |
| | Expected pass | Expected pass | Expected pass | Expected pass | Expected pass | PASS | Expected pass | Expected pass | PASS |
| Test temperature/ °C. | 28 | 28 | 28 | 28 | 28 | 28 | 28 | 28 | 28 |
| | Soil biodegradability test result (after two years) | | | | | | | | |
| | Expected pass | Expected pass | Expected pass | Expected pass | Expected pass | Expected pass | Expected pass | Expected pass | Expected pass |
| Test temperature/ °C. | 25 | 25 | 25 | 25 | 25 | 25 | 25 | 25 | 25 |

TABLE 1-continued

Results and parameters for home compostability and soil biodegradability tests

| Component | MM2 | MM3 | MM4 | MM5 | MM6 | Neat PLA | Neat PBSA | Neat PBAT |
|---|---|---|---|---|---|---|---|---|
| PLA wt % | 20 | 28 | 36 | 44 | 39 | 100 | 0 | 0 |
| PBSA wt % | 5 | 7 | 9 | 11 | 10 | 0 | 100 | 0 |
| PBAT wt % | 49 | 39 | 29 | 19 | 42 | 0 | 0 | 100 |
| Talc wt % | 25 | 25 | 25 | 25 | 8 | 0 | 0 | 0 |
| SMS wt % | 1 | 1 | 1 | 1 | 1 | 0 | 0 | 0 |

Home compostability test result (after one year)

| | MM2 | MM3 | MM4 | MM5 | MM6 | Neat PLA | Neat PBSA | Neat PBAT |
|---|---|---|---|---|---|---|---|---|
| | PASS | PASS | PASS | PASS | PASS | FAIL | PASS | PASS |
| Test temperature/°C. | 28 | 28 | 28 | 28 | 28 | 28 | 28 | 28 |

Soil biodegradability test result (after two years)

| | MM2 | MM3 | MM4 | MM5 | MM6 | Neat PLA | Neat PBSA | Neat PBAT |
|---|---|---|---|---|---|---|---|---|
| | Expected pass | Expected pass | Expected pass | Expected pass | Expected pass | FAIL | Expected pass | PASS |
| Test temperature/°C. | 25 | 25 | 25 | 25 | 25 | 25 | 25 | 25 |

TABLE 1.1

Progress of biodegradation testing

| Sample ID | PB2.1 | PB2.2 | PB2.3 | PB3.1 | PB3 | PB2.4 | PB3.2 |
|---|---|---|---|---|---|---|---|
| Duration of test at time of writing/days | 256 (test completed) | 273 | 273 | 180 | 180 | 180 | 180 |
| Total test duration/days | 365 | 365 | 365 | 365 | 365 | 365 | 365 |
| Absolute bio-degradation/% | 96.8 | 71.8 | 88.6 | 50.5 | 38.7 | 36.0 | 61.1 |
| Relative bio-degradation/% | 97.7 | 72.5 | 89.5 | 52.7 | 40.3 | 37.5 | 63.7 |

TABLE 2

Tensile properties of polymers, polymer blends and mixed materials

| Component | PB1 | PB2 | PB3 | PB4 | PB5 | PB6 | MM1 | MM2 | Neat PLA | Neat PBSA | Neat PBAT |
|---|---|---|---|---|---|---|---|---|---|---|---|
| PLA wt % | 93 | 90 | 85 | 80 | 70 | 60 | 12 | 20 | 100 | 0 | 0 |
| PBSA wt % | 7 | 10 | 15 | 20 | 30 | 40 | 3 | 5 | 0 | 100 | 0 |
| PBAT wt % | 0 | 0 | 0 | 0 | 0 | 0 | 59 | 49 | 0 | 0 | 100 |
| Talc wt % | 0 | 0 | 0 | 0 | 0 | 0 | 25 | 25 | 0 | 0 | 0 |
| SMS wt % | 0 | 0 | 0 | 0 | 0 | 0 | 1 | 1 | 0 | 0 | 0 |

| Tensile property | | | | | | Value | | | | | |
|---|---|---|---|---|---|---|---|---|---|---|---|
| Young's modulus/MPa | 1310.0 | 968.0 | 939.0 | 1030.0 | 786.0 | 813.0 | 252.0 | 394.0 | 1556 | 300.0 | 52.0 |
| Stress at 1% strain/MPa | 12.5 | 11 | 25.0 | 23.4 | 32.2 | 22.4 | 11.8 | 15.8 | 10 | | 4.5 |
| Yield strength/MPa | 69.6 | 63.4 | 59.0 | 52.9 | 49.4 | 43.2 | 12.2 | 15.8 | 78.3 | 17.0 | |
| Yield strain/% | 4.5 | 4.5 | 4.6 | 4.2 | 4.7 | 4.3 | 16.0 | 11.0 | 5.3 | | |
| Tensile strength/MPa | 69.3 | 63.1 | 59.0 | 52.9 | 49.4 | 43.2 | 16.7 | 15.8 | 78.1 | 24.0 | 16.3 |
| Strain at tensile strength/% | 4.5 | 4.5 | 4.6 | 4.2 | 4.7 | 4.3 | | 11.0 | 5.0 | | 610.0 |
| Nominal strain at tensile strength/% | 4.5 | 4.5 | 4.6 | 4.2 | 4.7 | 4.3 | 370.0 | 11.0 | 5.0 | | 610.0 |
| Stress at break/MPa | 31.0 | 53.2 | 24.5 | 17.5 | 21.8 | 16.9 | 16.2 | 6.1 | 72.5 | 24.0 | |
| Strain at break/% | 6 | 5 | 8 | 11 | 16 | 15 | 370 | 92 | 4.5 | 380.0 | |
| Nominal strain at break/% | 6.4 | 5.5 | 8.3 | 11.0 | 16.0 | 15.0 | 370.0 | 92.0 | 5.8 | | |

TABLE 3

Flexural properties of polymers, polymer blends and mixed materials

| Component | PB1 | PB2 | PB3 | PB4 | PB5 | PB6 | MM1 | MM2 | MM3 | MM4 | MM5 | Neat PLA | Neat PBSA | Neat PBAT |
|---|---|---|---|---|---|---|---|---|---|---|---|---|---|---|
| PLA wt % | 93 | 90 | 85 | 80 | 70 | 60 | 12 | 20 | 28 | 36 | 44 | 100 | 0 | 0 |
| PBSA wt % | 7 | 10 | 15 | 20 | 30 | 40 | 3 | 5 | 7 | 9 | 11 | 0 | 100 | 0 |
| PBAT wt % | 0 | 0 | 0 | 0 | 0 | 0 | 59 | 49 | 39 | 29 | 19 | 0 | 0 | 100 |
| Talc wt % | 0 | 0 | 0 | 0 | 0 | 0 | 25 | 25 | 25 | 25 | 25 | 0 | 0 | 0 |
| SMS wt % | 0 | 0 | 0 | 0 | 0 | 0 | 1 | 1 | 1 | 1 | 1 | 0 | 0 | 0 |

| Flexural property | Value | | | | | | | | | | | | | |
|---|---|---|---|---|---|---|---|---|---|---|---|---|---|---|
| Flexural modulus/MPa | 3640.0 | 3250.0 | 2980.0 | 2730.0 | 2290.0 | 1870.0 | 642.0 | 938.0 | 1450.0 | 2040.0 | 2630.0 | 4130.0 | 250.0 | 30.8 |
| Flexural stress at standard deflection/MPa | 100.0 | 93.7 | 87.2 | 81.0 | 70.6 | 58.0 | 12.8 | 19.2 | 27.7 | 38.4 | 49.0 | 117.0 | | 3.1 |
| Flexural strength/MPa | 100.0 | 94.0 | 87.5 | 81.2 | 72.2 | 59.0 | 15.7 | 21.7 | 29.2 | 39.4 | 49.4 | 119.0 | 18.0 | 5.7 |
| Strain at flexural strength/% | 3.5 | 3.7 | 3.8 | 3.7 | 4.3 | 4.0 | 7.2 | 6.7 | 5.3 | 4.6 | 4.1 | 4.3 | | 8.0 |
| Stress at break/MPa | no break at 10% | no break at 10% | no break at 10% | no break at 10% | no break at 10% | no break at 10% | no break at 15% | no break at 15% | no break at 10% | no break at 10% | no break at 15% | 114.0 | | |
| Strain at break/% | >10 | >10 | >10 | >10 | >10 | >10 | >15 | >15 | >10 | >10 | >15 | 5.4 | | |

TABLE 4

Thermal properties of polymers, polymer blends and mixed materials

| Component | PB1 | PB2 | PB3 | PB4 | PB5 | PB6 | MM1 | MM2 | MM3 | MM4 | MM5 | MM6 | Neat PLA | Neat PBSA | Neat PBAT |
|---|---|---|---|---|---|---|---|---|---|---|---|---|---|---|---|
| PLA wt % | 93 | 90 | 85 | 80 | 70 | 60 | 12 | 20 | 28 | 36 | 44 | 39 | 100 | 0 | 0 |
| PBSA wt % | 7 | 10 | 15 | 20 | 30 | 40 | 3 | 5 | 7 | 9 | 11 | 10 | 0 | 100 | 0 |
| PBAT wt % | 0 | 0 | 0 | 0 | 0 | 0 | 59 | 49 | 39 | 29 | 19 | 42 | 0 | 0 | 100 |
| Talc wt % | 0 | 0 | 0 | 0 | 0 | 0 | 25 | 25 | 25 | 25 | 25 | 8 | 0 | 0 | 0 |
| SMS wt % | 0 | 0 | 0 | 0 | 0 | 0 | 1 | 1 | 1 | 1 | 1 | 1 | 0 | 0 | 0 |

| Thermal property | Value | | | | | | | | | | | | | | |
|---|---|---|---|---|---|---|---|---|---|---|---|---|---|---|---|
| Melt flow index (190° C./2.16 kg)/g · (10 min)$^{-1}$ | 14.5 to 17.5 | 15.74 | 12.43 | 12 to 15 | 7.73 | 2.71 | 24 | 7.42 | 21.3 | 8.92 | 22.81 | 9.7 | 24 (210° C.) | 4 | <5 |
| Heat deflection temperature/° C. | 54.5 | 54 | 53.4 | 52.4 | 54.2 | 54 | 50.7 | 51.9 | 53.6 | 53.9 | 54.3 | 54 | 55.3 | 57 | |

TABLE 5

Compounding and injection moulding parameters for PB4 polymeric blends

| Compounder | Screw speed/RPM | 500 | 400 | 300 | 225 | 225 (LS) |
|---|---|---|---|---|---|---|
| | Screw type | High shear | High shear | High shear | High shear | Low shear |
| | Throughput/kg · h$^{-1}$ | 9 | 9 | 9 | 9 | 9 |
| | Sample ID | PB4-500HS | PB4-400HS | PB4-300HS | PB4-225HS | PB4-225LS |
| | Die pressure/bar | 2 | 4 | 5 | 5 | 5 |
| | Torque/% | 50-65 (was very unstable) | 58 | 63 | 66 | 60 |
| | Power/kW | 3.1 | 2.3 | 2 | 1.5 | 1.4 |
| | Specific mechanical energy/kW · h · kg$^{-1}$ | 0.342 | 0.284 | 0.231 | 0.182 | 0.165 |

TABLE 5-continued

| Compounding and injection moulding parameters for PB4 polymeric blends | | | | | | |
|---|---|---|---|---|---|---|
| Injection moulder | Injection pressure/bar | 102 | 103 | 100 | 101 | 105 |
| | Fill time/s | 0.42 | 0.42 | 0.42 | 0.42 | 0.42 |
| | Plasticizing time/s | 3.18 | 3.3 | 3.36 | 3.38 | 3.38 |

What is claimed is:

1. A method of improving the home compostability and/or soil biodegradability of a substance comprising one or more polymers, the method comprising: mixing the substance comprising one or more polymers with poly(butylene succinate co-adipate) (PBSA) and poly(butylene adipate-co-terephthalate) (PBAT) to form a mixed material wherein the substance comprising one or more polymers comprises poly(lactic acid) (PLA); and wherein the mixed material comprises:
   a ratio of 11:89 to 19:81 PBSA to PLA, based on the weights of said PBSA and PLA and wherein the sum of integers in the ratio is 100; and
   at least 5 wt %, collectively, of PBSA and PLA, based on the total weight of the mixed material; and
   at least 25 wt % PBAT, based on the total weight of the mixed material.

2. The method of claim 1, wherein the mixing the substance comprising one or more polymers with poly(butylene succinate co-adipate) (PBSA) comprises intimately mixing the substance comprising one or more polymers with poly(butylene succinate co-adipate) (PBSA).

3. The method according to claim 1, wherein the substance comprising one or more polymers further comprises poly(caprolactone) (PCL).

4. The method according to claim 1, comprising mixing the PBSA with the substance comprising one or more polymers at high specific mechanical energy.

5. The method according to claim 1, wherein the mixed material comprises around 25 to 50 wt % PBAT, based on the total weight of the mixed material.

6. The method according to claim 1, wherein the mixed material comprises around 20 to 55 wt % collectively of PBSA and PLA, based on the total weight of the mixed material.

7. The method according to claim 1, comprising mixing the PBSA and substance comprising one or more polymers at a specific mechanical energy of around 0.30 to 1.00 kW·h·kg$^{-1}$.

8. The method according to claim 1, comprising mixing the PBSA and substance comprising one or more polymers with a screw mixer rotating at a screw speed of around 350 to 1000 rpm.

9. The method according to claim 1, wherein the mixed material is melt spinnable.

10. The method according to claim 1, wherein the mixed material has an extensional viscosity of around 1 to 3 kPa·s.

11. The method according to claim 1, wherein the mixed material comprises at least around 7.5 wt % PLA, based on the total weight of the mixed material.

12. The method according to claim 1, wherein the mixed material comprises a ratio of 11:89 to 17:83 PBSA to PLA, based on the weights of said PBSA and PLA and wherein the sum of integers in the ratio is 100.

13. The method according to claim 1, wherein the mixed material comprises at least 35 wt % PBAT, based on the total weight of the mixed material.

14. The method according to claim 1, wherein the mixed material comprises at least 45 wt % PBAT, based on the total weight of the mixed material.

15. A product comprising a mixed material, said mixed material comprising poly(lactic acid)(PLA), poly(butylene succinate co-adipate)(PBSA) and poly(butylene adipate-co-terephthalate)(PBAT), wherein the mixed material is home compostable and/or soil biodegradable; and
   wherein the mixed material comprises:
      a ratio of 11:89 to 19:81 PBSA to PLA, based on the weights of said PBSA and PLA and wherein the sum of integers in the ratio is 100; and
      at least 5 wt %, collectively, of PBSA and PLA, based on the total weight of the mixed material; and
      at least 25 wt % PBAT, based on the total weight of the mixed material;
      wherein the mixed material has improved home compostability and/or soil biodegradability over the PLA.

16. The product according to claim 15, wherein the product is a wrapping material.

17. The product according to claim 16, wherein the wrapping material is a tree guard.

18. The product according to claim 15, wherein the product is a non-woven material.

* * * * *